US010192389B2

(12) United States Patent
Cardno et al.

(10) Patent No.: US 10,192,389 B2

(45) Date of Patent: Jan. 29, 2019

(54) METHODS, APPARATUS AND SYSTEMS FOR DETERMINING AN ADJUSTMENT VALUE OF A GAMING DEVICE

(75) Inventors: Andrew John Cardno, San Diego, CA (US); Peter Stewart Ingham, Lower Hutt (NZ); Bart Andrew Lewin, Woodland Hills, CA (US); Ashok Kumar Singh, Henderson, NV (US)

(73) Assignee: New BIS Safe Luxco S.à.r.l., Luxembourg (LU)

( * ) Notice: Subject to any disclaimer, the term of this patent is extended or adjusted under 35 U.S.C. 154(b) by 713 days.

(21) Appl. No.: 13/061,668

(22) PCT Filed: Aug. 31, 2009

(86) PCT No.: PCT/NZ2009/000179

§ 371 (c)(1),
(2), (4) Date: Aug. 19, 2011

(87) PCT Pub. No.: WO2010/024697

PCT Pub. Date: Mar. 4, 2010

(65) Prior Publication Data

US 2011/0294566 A1 Dec. 1, 2011

Related U.S. Application Data

(60) Provisional application No. 61/093,428, filed on Sep. 1, 2008.

(51) Int. Cl.
*A63F 9/24* (2006.01)
*A63F 13/00* (2014.01)
(Continued)

(52) U.S. Cl.
CPC .......... *G07F 17/32* (2013.01); *G07F 17/3237* (2013.01)

(58) Field of Classification Search
CPC ... G07F 17/32; G07F 17/3237; G07F 17/3244
(Continued)

(56) References Cited

U.S. PATENT DOCUMENTS

| | | |
|---|---|---|
| 5,761,647 A | 6/1998 | Boushy |
| 6,871,194 B1 | 3/2005 | Cardno |

(Continued)

FOREIGN PATENT DOCUMENTS

| | | |
|---|---|---|
| WO | WO 03/089084 | 10/2003 |
| WO | WO 2007/033005 | 3/2007 |

OTHER PUBLICATIONS

Wikipedia; "Heat map"; Date Accessed, Jun. 10, 2008; http://en.wikipedia.org/wiki/Heat_map—retrieved at http://en.wikipedia.org/w/index.php?title=Heat_map&direction=prev&oldid=227363166.

(Continued)

*Primary Examiner* — Omkar Deodhar
*Assistant Examiner* — Wei Lee
(74) *Attorney, Agent, or Firm* — Merchant & Gould P.C.

(57) ABSTRACT

A method of transforming behavioral interaction data into visually interpretable information, the method including the steps of providing instructions to an end user to assist the end user in obtaining behavioral interaction data associated with a gaming environment including one or more gaming assets; determining one or more summaries of the obtained behavioral interaction data that enable the end user to understand how the gaming environment is affected by the behavioral interaction data.

18 Claims, 15 Drawing Sheets

(51) Int. Cl.
*G06F 17/00* (2006.01)
*G06F 19/00* (2018.01)
*G07F 17/32* (2006.01)

(58) Field of Classification Search
USPC .......................................... 463/16, 20, 25, 42
See application file for complete search history.

(56) References Cited

U.S. PATENT DOCUMENTS

| | | | | |
|---|---|---|---|---|
| 8,029,360 | B2 * | 10/2011 | Lind et al. | 463/29 |
| 8,257,170 | B2 * | 9/2012 | Linard et al. | 463/29 |
| 2002/0138461 | A1 | 9/2002 | Sinclair et al. | |
| 2003/0228902 | A1 * | 12/2003 | Walker | G07F 17/32 463/25 |
| 2004/0005919 | A1 * | 1/2004 | Walker et al. | 463/23 |
| 2004/0053681 | A1 * | 3/2004 | Jordan et al. | 463/20 |
| 2004/0127281 | A1 * | 7/2004 | Fong | G07F 17/32 463/20 |
| 2004/0166940 | A1 * | 8/2004 | Rothschild | 463/42 |
| 2006/0281543 | A1 * | 12/2006 | Sutton | G07F 17/32 463/29 |
| 2007/0060375 | A1 * | 3/2007 | Hein | G07F 17/3267 463/42 |
| 2007/0060830 | A1 | 3/2007 | Le et al. | |
| 2007/0087834 | A1 * | 4/2007 | Moser et al. | 463/42 |
| 2008/0032787 | A1 * | 2/2008 | Low et al. | 463/29 |

OTHER PUBLICATIONS

Nasdaq; Nasdaq-100 Dynamic Heatmap;Date Accessed, Jun. 10, 2008; http://screening.nasdaq.com/heatmaps/heatmap_100.asp.
Weather.com; Date Accessed, Jan. 31, 2008; http://weather.com/—retrieved at http://web.archive.org/web/20080131213729/http://www.weather.com/.
Information Aesthetics; Information Aesthetics; "travel time maps"; Date Accessed, Jan. 31, 2008; http://infosthetics.com/archives/locative/—retrieved at http://web.archive.org/web/20080118183919/http://infosthetics.com/archives/locative/.
Few, Stephen—from white paper "BizViz: The Power of Visual Business Intelligence"—Mar. 7, 2006. www.perceptualedge.com.
Wikipedia; Wikipedia; "Voronoi Diagram"; Date Accessed, Jan. 31, 2008; http://en.wikipedia.org/wiki/Voronoi_diagram—retrieved at http://en.wikipedia.org/w/index.php?title=Voronoi_diagram&oldid=186998992.
Wikipedia; Wikipedia; "Agile Software Development"; Date Accessed, Jan. 30, 2008; http://en.wikipedia.org/wiki/Agile_software_development—retrieved at http://en.wikipedia.org/w/index.php?title=Agile_software_development&direction=prev&oldid=188287733.
Kimball, Ralph, A Dimensional Modeling Manifesto; Date Accessed: Apr. 10, 2008; http://www.dbmsmag.com/9708d15.html retrieved at http://web.archive.org/web/20080511165658/http://www.dbmsmag.com/9708d15.html.
Sam's Publishing; developer.com Gamelan™; "Introduction to EJB's"; http://www.developer.com/java/ejb/article.php/1434371.
Wikipedia; Wikipedia: "Dimensional Modeling"; Date Accessed: Apr. 10, 2008; http://en.wikipedia.org/wiki/Dimensional_modeling—retrieved at http://en.wikipedia.org/w/index.php?title=Dimensional_modeling&direction=prev&oldid=208379041.
Gilbert, Cheryl, et. al.; SearchCIO—Midmarket; "IIOP"; date Accessed, Jan. 30, 2008; http://searchcio-midmarket.techtarget.com/sDefinition/0,,sid183_gci214019,00.html—retrieved at http://web.archive.org/web/20080206145208/http://searchcio-midmarket.techtarget.com/sDefinition/0,,sid183_gci214019,00.html.
Google; Google Maps; "KML Gallery: Explore the Earth on Google"; Date Accessed, Jan. 30, 2008; http://earth.google.com/gallery/—retrieved at http://web.archive.org/web/20080213052317/http://earth.google.com/gallery/.
Wikipedia; Wikipedia; "Mean down time"; Date Accessed, Jan. 30, 2008; http://en.wikipedia.org/wiki/Mean_down_time.—retrieved at http://en.wikipedia.org/w/index.php?Mean_down_time&oldid=186946518.
Wikipedia; Wikipedia; "Mean time between failures"; Date Accessed, Jan. 30, 2008; http://en.wikipedia.org/wiki/Mean_time_between_failures.—retrieved at http://en.wikipedia.org/w/index.php?title=Mean_time_between_failures&oldid=187007574.
Wikipedia; Wikipedia; "Mean time to recovery"; Date Accessed, Jan. 30, 2008; http://en.wikipedia.org/wiki/Mean_time_to_recovery.—retrieved at http://en.wikipedia.org/w/index.php?title=Mean_time_to_recovery&oldid=186718939.
Paris Technologies, Inc.; Paris Technologies; "OLAP"; Date Accessed, Jan. 30, 2008; http://www.olap.com.—retrieved at http://web.archive.org/web/20080215091900/http://www.olap.com/.
Wikipedia; Wikipedia; "Planogram"; Date Accessed, Jan. 30, 2008; http://en.wikipedia.org/wiki/Planogram.—retrieved at http://en.wikipedia.org/w/index.php?title=Planogram&direction=prev&oldid=191335905.
Wikipedia; Wikipedia; "Software as a Service"; Date Accessed, Jan. 30, 2008; http://en.wikipedia.org/wiki/Software_as_a_Service.—retrieved at http://en.wikipedia.org/w/index.php?title=Software_as_a_service&oldid=187899008.
Wikipedia; Wikipedia; "Self-organizing map"; Date Accessed, Jan. 30, 2008; http://en.wikipedia.org/wiki/Self-organizing_map.—retrieved at http://en.wikipedia.org/w/index.php?title=Self-organizing_map&oldid=178977188.
Zeiger, Stefan, Servlet Essentials, Version 1.3.6—Nov. 4, 1999; Date Accessed, Jan. 30, 2008 http://www.novocode.com/doc/servlet-essentials/—retrieved at http://web.archive.org/web/20080113015246/http://www.novocode.com/doc/servlet-essentials/.
Six Sigma; Subject Matter Expert—SME; Date Accessed: Jan. 30, 2008; http://www.isixsigma.com/dictionary/Subject_Matter_Expert_-_SME-396.htm—retrieved at http://web.archive.org/web/20080222172537/http://www.isixsigma.com/dictionary/Subject_Matter_Expert_-_SME-396.htm.
IBM; WebSphere Product Pages; "WebSphere software"; Date Accessed: Jan. 30, 2008; http://www-306.ibm.com/software/websphere/?pgel=ibmhzn&cm_re=masthead-_-products-_-sw-websphere.—retrieved at http://web.archive.org/web/20080829031823/http://www-01.ibm.com/software/websphere/?pgel=ibmhzn&cm_re=masthead-_-products-_-sw-websphere.

* cited by examiner 710
715
720
725
730
735
740

705

METHODS, APPARATUS AND SYSTEMS FOR DETERMINING AN ADJUSTMENT VALUE OF A GAMING DEVICE

This application is a National Stage Application of PCT/NZ2009/000179, filed 31 Aug. 2009, which claims benefit of U.S. Provisional Serial No. 61/093,428, filed 1 Sep. 2008 and which applications are incorporated herein by reference. To the extent appropriate, a claim of priority is made to each of the above disclosed applications.

FIELD OF THE INVENTION

The present invention relates to methods, apparatus and systems for determining an adjustment value of a gaming device.

BACKGROUND

A chart or graph is described in Wikipedia as a type of information graphic or graphic organizer that represents tabular numeric data and/or functions. Charts are often used to make it easier to understand large quantities of data and the relationship between different parts of the data. Charts can usually be read more quickly than the raw data that they come from. They are used in a wide variety of fields, and can be created by hand (often on graph paper) or by computer using a charting application.

Traditional charts use well established and often poorly implemented ways of representing data. Many tools exist to help the user construct very sophisticated representations of data but that sophistication typically results in less meaningful charts. Embodiments of the present invention aim to overcome this problem.

It is known to use charting wizards such as those that are available in Excel and various other systems such as those provided by, for example, IBM. In addition there are multiple Business Intelligence (BI) tools available to users to enable users to analyze data in an attempt to create meaningful feedback. However, as the amount of data increases, so does the complexity of the visual representations created by the analysis of the data. These complex representations can end up swamping parts of the visual representation that is most required and relevant to an end user.

In addition, known systems provide a standardized list of options to all users which the user then must wade through and try and determine which of the options available are most suitable for representing their particular data. This can result in the user mismatching the data being represented with the chosen visual representation so that the resultant representation does not clearly, accurately and succinctly identify any issues with, or convey information about, the data. This can result in the user missing particularly important features of the data due to those features not being represented in the most appropriate manner.

Also, although there are many sophisticated visualization algorithms that do exist and are being developed for specific functions, these algorithms are not provided to a user in a manner that guides the user to easily pick the data to be represented, pick the correct summaries of the data, pick the right dimensions to be represented, pick the right forms of visual representation, or choose unique visual designs to create a collection of visualizations that help someone run their business.

Further, the focus of existing known methods is on providing a single visual design, or type of visual or graphical representation, to represent data. That is, to produce, for example, a single bar graph to be displayed, or a single pie chart to be printed. This is very limiting to a user who may want to show various different aspects of the data in a single document.

Business measures are a well known means of identifying a manageable number of algorithms for which to run a business. However, these business measures merely represent a single dimension of the data, or even only a single number, and so are particularly limiting in respect of the data that they represent. Further, the business measures merely represent data and do not include any further functional capabilities.

This is particularly pertinent to the Gaming Industry, because gaming venues can collect data, which can be in large volumes, or diverse, detailed, timely or accurate information, on their customers' purchasing behavior or movements within the facility in the normal course of providing the gaming business or from external sources. Examples of this data include the amount gambled by game, how much time has been spent playing each game, what has occurred (e.g., winning of jackpots) during customers' game play. Additionally, similar data is collected regarding non-gaming purchases (e.g., food and beverage, special events, lodging). Finally, customers may be issued credit so data associated with granting credit lines (e.g., credit rating, credit limits, etc.) is also collected. This potentially large or dispersed data collection may be further refined by collecting into a centrally accessible point. This centrally accessible capability can be implanted in a number of ways including, a data warehouse or a data mart or a federated information collection.

The often related or diverse and sometimes large volumes of data collected by the Gaming Industry on a variety of areas of the business, including data on their customers, their operations or external data sets, benefit from methods for understanding this data. These methods may range from the simple analytical views to sophisticated analytical methods as herein described.

R-tree indexing methodologies, as well as other indexing methodologies, are used in conjunction with databases to categorize data and place the data in a hierarchical format. It is known to use self organizing maps to visually represent data. However, self organizing maps can be very difficult and arduous to interpret. Also, it has not previously been known to use the indexing methodologies, in particular the R-tree indexing, as a display mechanism on its own.

Classification algorithms, such as fast clustering genetic algorithms or dimension reduction algorithms, can result in highly complicated structures. These may include 2 displays, the R-Tree, which may provide interactive insight into, for instance, the relationship between a customer's play, the types of games played, and the location of the game relative to other games.

Various other references to the prior art and its associated problems are made throughout the following description.

In current gaming systems it is possible to determine the "actual win" associated with a gaming asset or device, such as a single or group of slot gaming machines or a single or group of gaming tables (e.g. electronic gaming tables), by determining the amount of money generated by the gaming assets.

The "actual win" generated by a gaming asset is the amount of money received from players (or customers) when the player loses money when using a gaming asset, e.g. loses a bet. For example, a Roulette player who places a bet of $50 on RED on a Roulette table will lose $50 if the outcome is BLACK. Therefore, the casino actual win for that transaction is $50.

The "theoretical win" value is based on the calculated probability of a gaming asset winning (hold percentage). That is, for example, if the probability of the casino profiting on transactions placed on a Roulette table is at 5%, then the theoretical win for the $50 transaction discussed above is 5% of $50, i.e. $2.50. The remaining money $47.50 is expected to be returned to players over a period of time.

However, current systems, including monitoring tools and customer relationship tools, do not take into account various other forms of gaming accounting, such as the use of bonuses, jackpots and free-plays for example, which can affect the amount of money won by customers. This can create distortion against the actual money generated in measurements associated with these calculations.

For example, these forms of accounting can significantly alter the amount of profit or loss associated with a gaming asset.

It is known to use neural networks in an attempt to predict how gaming assets will perform based on various inputs, such as the revenue received, spatial position and time of day. One example is discussed in U.S. Pat. No. 6,871,194 Interaction Prediction System and Method. The neural network uses a back propagation methodology in order learn how to predict future financial transactions with the gaming assets. However, these systems generally try to predict win values purely using self teaching loops based on previous performance and do not use additional inputs to aid in the calculation.

The present invention aims to overcome, or at least alleviate, some or all of the mentioned problems, or to at least provide the public with a useful choice.

SUMMARY OF THE INVENTION

Various concepts are herein disclosed as set out in the claims at the end of the specification.

BRIEF DESCRIPTION OF THE DRAWINGS

Embodiments of the present invention will now be described, by way of example only, with reference to the accompanying drawings, in which.

DETAILED DESCRIPTION OF THE INVENTION

Figure 1A:
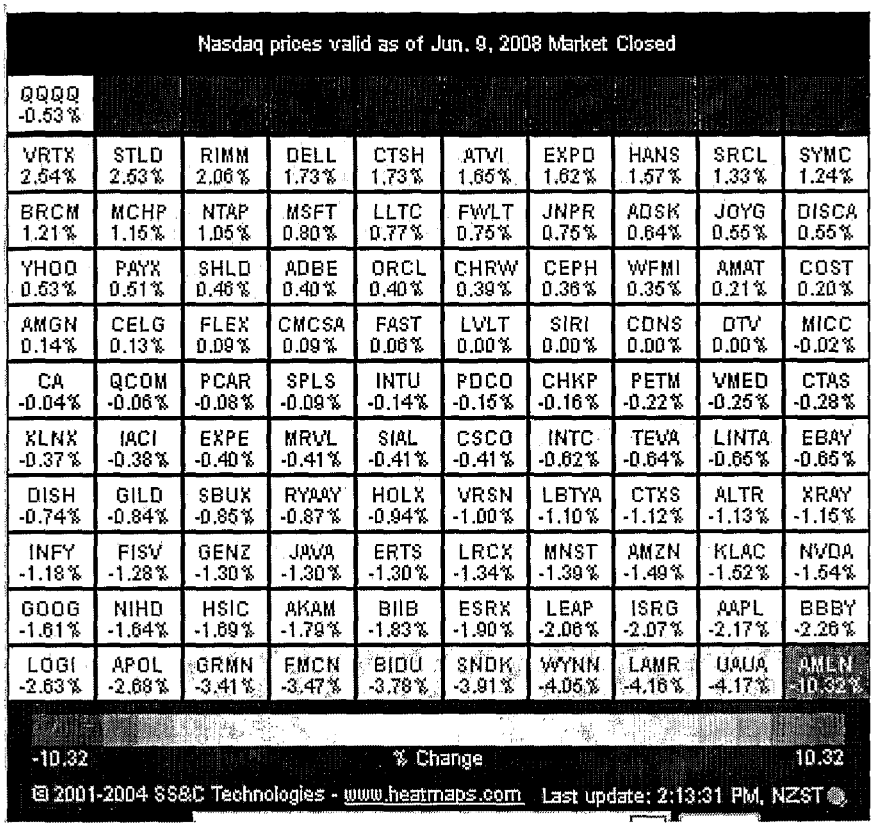
FIG. 1A shows a NASDAQ Heat Map Example.

Embodiments of the present invention are described herein with reference to a system adapted or arranged to perform a method for determining an adjustment value of a gaming device. The system for determining the adjustment value may be incorporated within a larger system designed to perform data visualization techniques.

In summary, the system at least includes at least a processor, one or more memory devices or an interface for connection to one or more memory devices, input and output interfaces for connection to external devices in order to enable the system to receive and operate upon instructions from one or more users or external systems, a data bus for internal and external communications between the various components, and a suitable power supply. Further, the system may include one or more communication devices (wired or wireless) for communicating with external and internal devices, and one or more input/output devices, such as a display, pointing device, keyboard or printing device.

The processor is arranged to perform the steps of a program stored as program instructions within the memory device. The program instructions enable the various methods of performing the invention as described herein to be performed. The program instructions may be developed or implemented using any suitable software programming language and toolkit, such as, for example, a C-based language. Further, the program instructions may be stored in any suitable manner such that they can be transferred to the memory device or read by the processor, such as, for example, being stored on a computer readable medium. The computer readable medium may be any suitable medium, such as, for example, solid state memory, magnetic tape, a compact disc (CD-ROM or CD-R/W), memory card, flash memory, optical disc, magnetic disc or any other suitable computer readable medium.

The system is arranged to be in communication with external data storage systems or devices in order to retrieve the relevant data.

The data provided as an input to the general system may be of any suitable type of data, for example, real world data including, but not limited to, gaming or gambling data associated with a gaming environment such as a casino, event data, test or quality control data obtained from a manufacturing environment, business data retrieved from an accounting system, sales data retrieved from a company database, etc. All this data may be received by the system in real time in a cache memory or may be stored in a more permanent manner.

Four key terms (or concepts) form the foundation of the specification set out in this document and accordingly have been defined as follows:

The four key terms are:

Business Performance Drivers (BPD)

BPD Packages

Visual Designs

Visual Documents

The key terms are defined as follows:

Business Performance Drivers (BPDs): A Business Performance Driver (BPD) is a business metric used to quantify a business objective. For example, turnover, sales. BPDs are Facts (sometimes referred to as measures). Facts are data items that can be counted. For example, Gross Sales; Units Sold. BPDs comprise of 1. Measures: Data items that can be counted. For example, Gross Sales; Units Sold.
2. Dimensions: Data items that can be categorized. For example, Gender; Locations.
3. Restrictions can be applied to BPDs. These filter the data included. For example a restriction of 'State="CA"' may be specified to only include data for California.
4. Normalizations can be applied to BPDs. These specify (or alter) the time period the BPD refers to. For example—Daily Units Sold, Monthly Profit. The combination of BPDs, Restrictions and Normalizations provides the flexibility to create many ways of looking at data without requiring extensive definition effort.

In other words a Business Performance Driver (BPD) is a 'measure' that can be normalized. Measures are data items that can be counted. For example, Gross Sales; Units Sold. BPDs might be displayed on visualizations. For example, Revenue earned per store on a map. Restrictions and/or Normalizations could be applied to a BPD. The following table provides examples of these:

| Scenario | Business Example |
|---|---|
| BPD (no normalization or restriction) | Revenue |
| BPD with restriction | Revenue earned in the state of California |
| BPD with normalization | Revenue earned in week 1 of 2008 |
| BPD with restriction and normalization | Revenue earned in the state of California in week 1 of 2008 |

BPD Packages: A BPD Package is made up from a set of related BPDs. This relationship (between a BPD Package and its BPDs) is defined using metadata. BPD Packages can be thought of as the Visual Document's vocabulary.

Visual Designs: Visual Designs are a classification of the different types of visualizations that a user may choose. Within each Visual Design, there are a number of visualizations. For example, the 'spatial' category can have retail store location maps or geographical location maps. The software solution allows users to select one visualization (one visual form within a Visual Design category) to create a Visual Document.

Visual Document: A Visual Document contains visual representations of data. Access to the data used to construct the visual representation is in many ways analogous to a textual document. A Visual Document is constructed by applying BPD data to a specific Visual Design. It is designed to illustrate at least one specific point (using the visualization), supports the points made with empirical evidence, and may be extended to provide recommendations based on the points made. The Visual Document is a deliverable to the user.

| | |
|---|---|
| Dimensions | Dimensions are data items that can be categorized. For example, Gender; Locations.<br>Dimensions might be displayed on visualizations. For example product categories on a shop floor. |
| Fact | See Business Performance Drivers (BPDs) |
| Measure | See Business Performance Drivers (BPDs) |
| Normalizations | Can be applied to BPDs. These specify (or alter) the time period the BPD refers to. For example - Daily Units Sold, Monthly Profit.<br>The combination of BPDs, Restrictions and Normalizations provides the flexibility to create many ways of looking at data without requiring extensive definition effort. Refer to definition of BPDs for examples. |
| Restrictions | Can be applied to BPDs or Dimensions. These filter the data included. For example a restriction of 'State = "CA"' may be specified to only include data for California.<br>A BPD or Dimension could be restricted by Compound Statements (series of restrictions using AND/OR statements). For example, Revenue from all stores where state = California AND units sold > 200 units.<br>Restrictions have the following types: |

| Restriction Type | Definition | Example | Business Context |
|---|---|---|---|
| = | Equal to | State = 'CA' | Revenue earned within the state of California |
| >= | Greater than or equal to | Units Sold >= 200 | Revenue earned from stores where units sold were greater than (or equal to) 200 units |
| =< | Less than or equal to | Revenue =< $50,000 | Revenue earned from stores where Revenue was less than (or equal to) $50,000 |
| > | Greater than | Units Sold > 200 | Revenue earned from stores where the number of units sold were greater than 200 units |
| < | Less than | Units Sold < 200 | Revenue earned from stores where the number of units sold were less than 200 units |
| IN | In (list) | State IN ('CA', 'NY') | Revenue earned from stores within the states of California and New York |
| BETWEEN | Values between X and Y | Product Code between '124' and '256' | Revenue earned from product codes 124 to 256 (inclusive) |

-continued

| | | | |
|---|---|---|---|
| NOT = | Not Equal to | State NOT = CA | Revenue earned from stores outside the state of California. |
| NOT IN | Not in (list) | State NOT IN ('CA', 'NY') | Revenue earned from outside the states of California and New York. |
| NOT BETWEEN | Values not between X and Y | Store Code NOT Between 105 and 110 | Revenue earned from stores excluding stores with a store code between 105 and 110 (inclusive). |

Heatmaps: A heat map is a graphical representation of data where the values taken by a variable in a two-dimensional map are represented as colors. A very similar presentation form is a Tree map.

Heat maps are typically used in Molecular Biology to represent the level of expression of many genes across a number of comparable samples (e.g. cells in different states, samples from different patients) as they are obtained from DNA microarrays.

Heat maps are also used in places where the data is volatile and representation of this data as a heat map improves usability. For example, NASDAQ uses heat maps to show the NASDAQ-100 index volatility. Source: Wikipedia[i].

This is shown diagrammatically in FIG. 1A. Some blocks are colored green, which means the stock price is up and some blocks are colored red, which means the stock price is down. The blocks have a varying deepening of the relevant color to indicate the direction that the stock is moving. The deeper the color, the bigger the move.

Figure 1B:
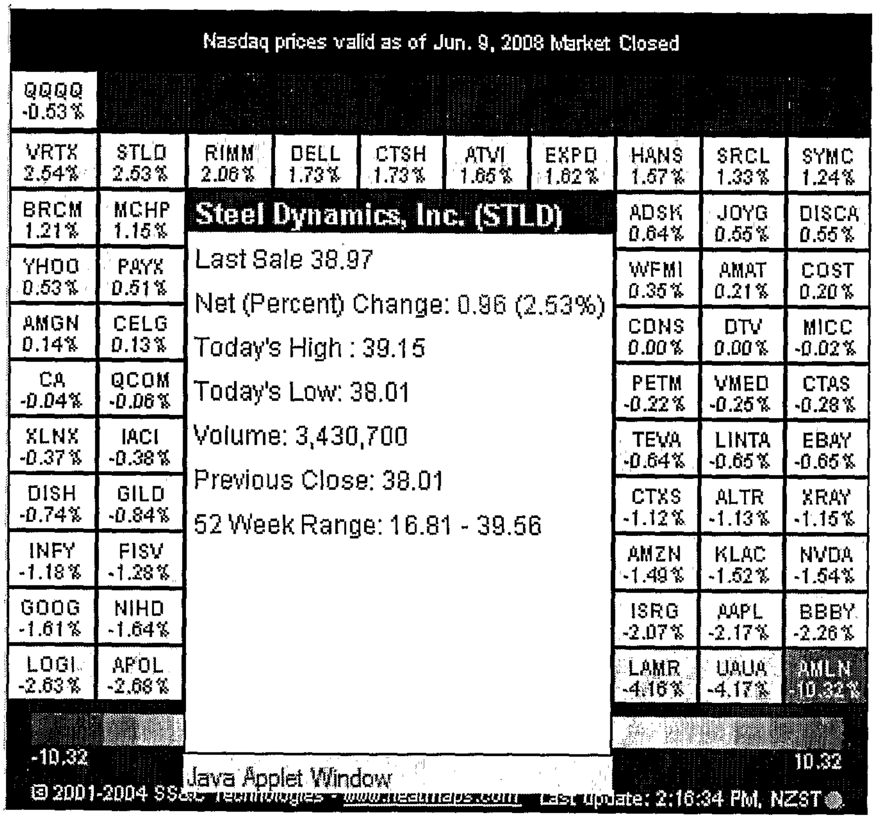
FIG. 1B shows a NASDAQ Heat Map Intra Day Data Example.

If a user hovers over a stock, additional intra-day data is presented—as shown in FIG. 1B: Source: Nasdaq.com[ii]

Figure 1C:
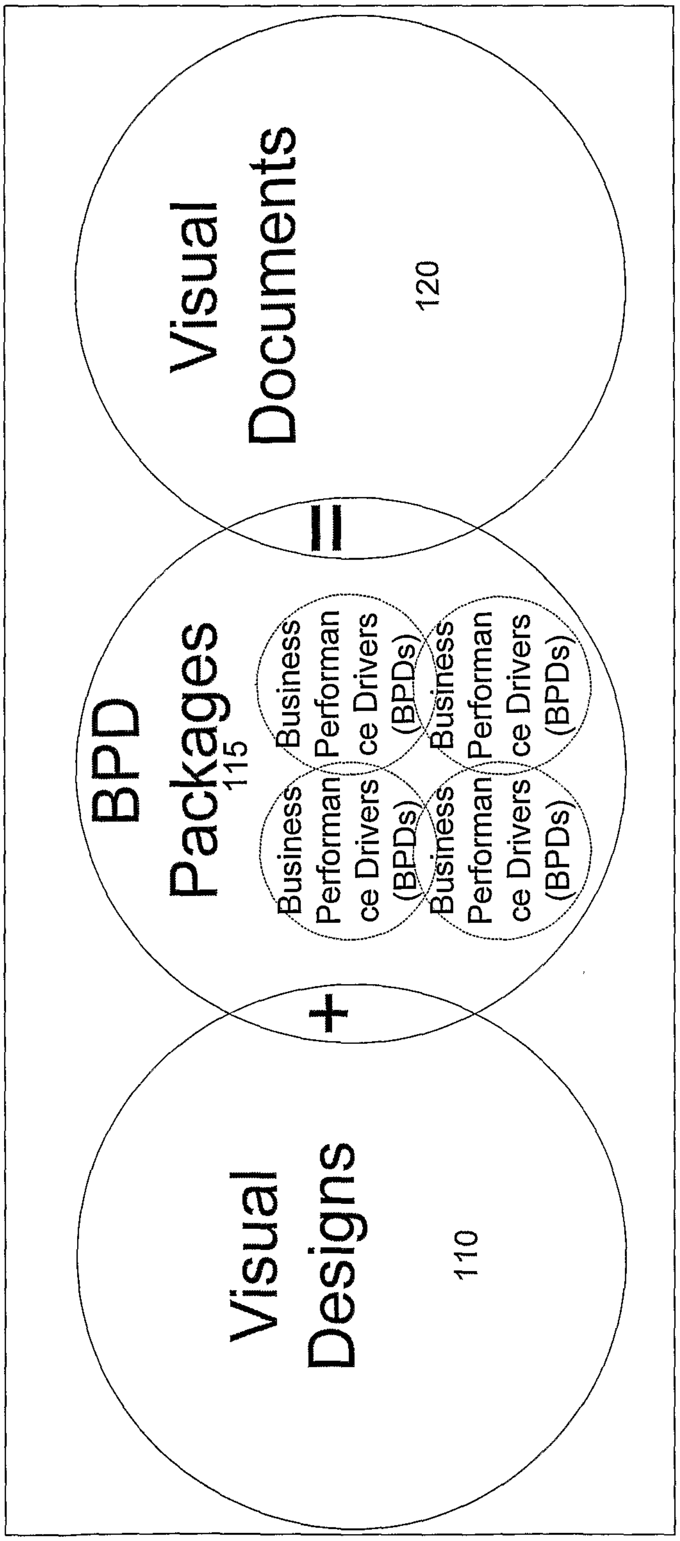
FIG. 1C shows a diagrammatical representation of some key terms.

The key terms are set out diagrammatically in FIG. 1C. Visual designs 110 are individual visualization techniques. One or more are applied to visualize BPD packages 115 to create visual documents 120.

Many organizations are facing massive and increasing amounts of data to interpret, the need to make more complex decisions faster, and accordingly are turning to data visualization as a tool for transforming their data into a competitive advantage. This is particularly true for high-performance companies, but it also extends to any organization whose intellectual property exists in massive, growing data sets.

One objective of the described solution is to put experts' data visualization techniques in the customer's hands by skillfully guiding the end user through choosing the right parameters, to display the right data, and to create its most useful visualizations to improve business performance.

The described solution is a generic tool and can apply to multiple business areas that require decisions based on and understanding massive amounts of data. The resulting browser-based output is defined as a 'Visual Document'.

Figure 2A:
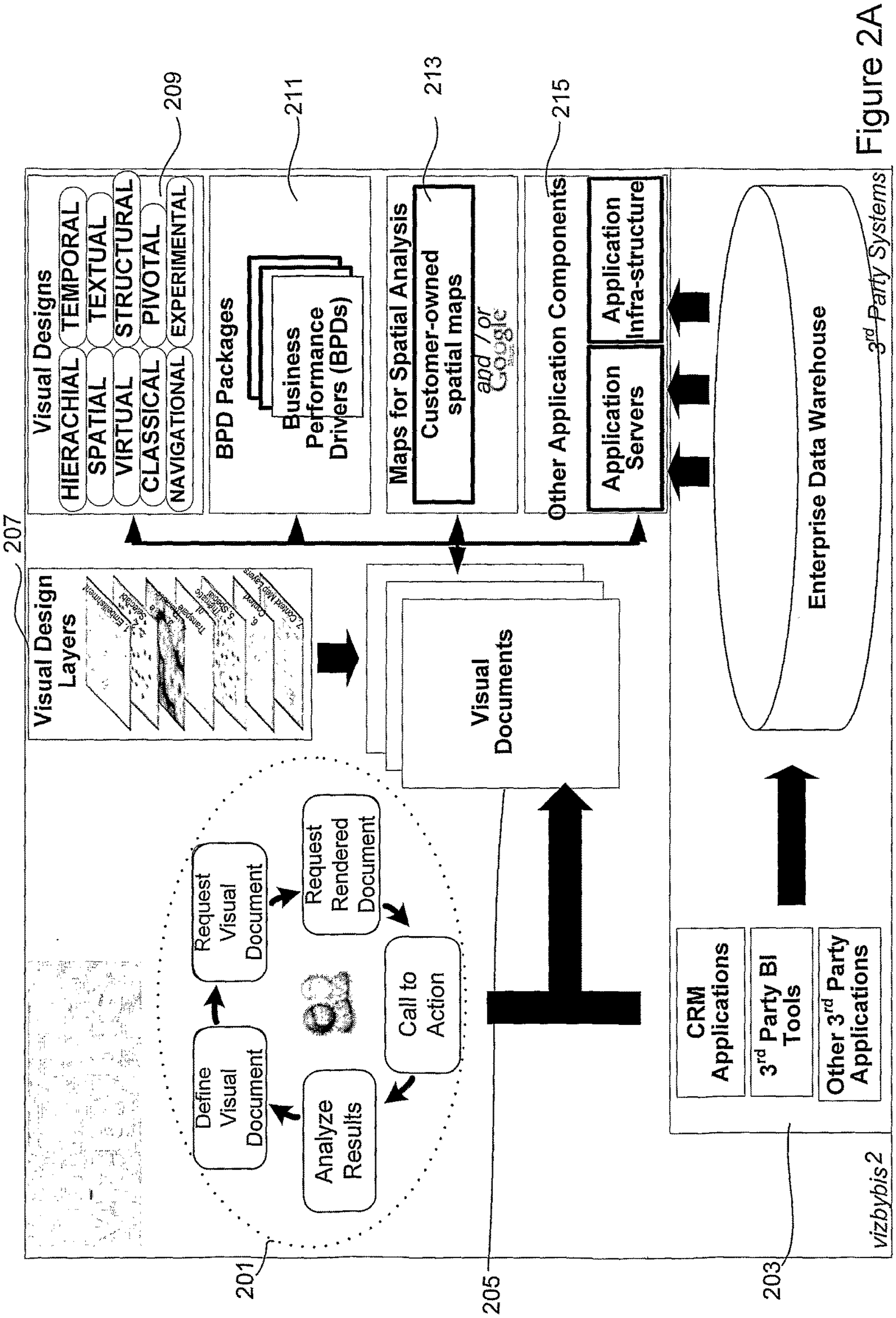
FIG. 2A shows a system concept diagram according to an embodiment of the present invention.

The solution provided is summarized in FIG. 2A.

The system identifies user tasks 201 in the form of defining visual documents, requesting visual documents, requesting rendered documents, calls to action, and analyzing results. These tasks are then detected by the system in conjunction with other systems 203, which include CRM applications, third party Business Intelligence (BI) Tools and other third party applications, all of which may access data stored in an enterprise data warehouse (EDW). The visual design layer concept 207 may be utilized within the visual documents 205. The creation of the visual documents is made in conjunction with a number of different defined visual design types 209, BPD packages 211, spatial analysis maps 213 and other application components 215, such as application servers and application infrastructure.

A Visual Document contains visual representations of data. Access to the data used to construct the visual representation is in many ways analogous to a textual document. It is constructed by applying Business Performance Driver (s) (BPD) data to a specific Visual Design (Visual Designs are grouped into ten classifications).

A Visual Document is designed to illustrate at least one specific point (using the visualization), support the points made with empirical evidence, and may be extended to provide recommendations based on the points made. The Visual Document is the actual deliverable from the software to the software user. Visual Documents may be stored, distributed or analyzed later, as needed.

The Visual Document is fed by data and a metadata database that stores definitions of BPDs—the BPDs are the focus of the Visual Document. A Business Performance Driver is a business metric used to quantify a business objective. Examples include, gross sales or units sold. For instance, the Visual Document may be used to graphically depict the relationship between several BPDs over time.

In the Visual Document, data is rendered in up to seven layers in one embodiment. However, it will be understood that the number of layers may be varied as needed by the user. Specific Visual Document Layers are described herein. However, it will be understood that further Visual Document Layers may be included over and above the specific types described.

Visual Designs are explicit techniques that facilitate analysis by quickly communicating sets of data (termed BPD Packages) related to BPDs. Once constructed, Visual Documents may be utilized to feed other systems within the enterprise (e.g., Customer Relationship Management (CRM) systems), or directly generate calls to action.

The described solution utilizes the best available technical underpinnings, tools, products and methods to actualize the availability of expert content.

At its foundation, the solution queries data from a high performance enterprise data warehouse characterized by parallel processing. This database can support both homogeneous (identical) and heterogeneous (differing but intersecting) databases. The system is adaptable for use with a plurality of third party database vendors.

A scalable advanced web server framework can be employed to provide the necessary services to run the application and deliver output over the web. A flexible and controllable graphics rendering engine can be used to maximize the quality and speed levels required to support both static and dynamic (which could be, for example, animated GIF, AVI or MPEG) displays. All components can operate with a robust operating system platform and within secure network architecture.

Pre-existing (and readily available) third party components can be employed to manage user security (e.g. operating system security), industry specific applications and OLAP (Online Analytical Processing) or other more traditional reporting. The described solution is designed to facilitate speedy and reliable interfaces to these products.

A predictive modeling interface assists the user in analyzing forecasted outcomes and in 'what if' analysis.

Strict security, testing, change and version control, and documentation standards can govern the development methodology.

Many organizations are facing massive and increasing amounts of data to interpret, the need to make more complex decisions faster, and accordingly are turning to data visualization as a tool for transforming their data into a competitive advantage. This is particularly true for high-performance companies, but it also extends to any organization whose intellectual property exists in massive, growing data sets.

This clash of (a) more data, (b) the increased complexity of decisions and (c) the need for faster decisions was recently recognized in an IDC White Paper (Gantz, John et. al.; IDC White Paper; "Taming Information Chaos: A State-of-the-Art Report on the Use of Business Intelligence for Decision Making" November 2007), which described this clash as the "Perfect Storm" and that this 'storm' will drive companies to make a quantum leap in their use of and sophistication in analytics.

Today's business tools and the way they operate barely allow business users to cope with historical internal data, let alone internal real time, predictive, and external data.

Hence, a new paradigm in business intelligence solutions is required.

System Overview

As explained above, FIG. 2A shows a high-level overview of the system.

There are five key components to the system. These are:
1. Visual Documents;
2. Visual Designs;
3. Business Performance Drivers (and BPD Packages);
4. Spatial Maps;
5. Application Components.

A description of each of these components is set out below under the respective headings.

Visual Documents

The Visual Documents form the core of the solution from a user perspective. This may include visualization(s), associated data and/or metadata (typically the visual form) that the user defines requests and interacts with. The Visual Documents may consist of single frames or animated frames (which could be, for example, implemented in AVI, GIF or MPEG format or a sequence of still images).

The Visual Document is typically viewed in a dynamic web browser view. In this interactive view the user may observe, select and navigate around the document.

Once created, the Visual Documents may be stored in the database and may be distributed to key persons (printed, emailed etc.) or stored for later use and analysis.

Visual Designs

The Visual Designs are a classification of the different types of visualizations that a user may choose. Within each Visual Design category, there are a number of visualizations. For example, the 'spatial' category can have retail store location maps, network maps or geographical location maps, such as, for example, maps available from Google™ or Yahoo™.

The described system allows users to select one or more visualizations (e.g. one visual form within a Visual Design category) to create a Visual Document.

There are ten Visual Design categories defined below, however it will be understood that further Visual Designs are envisaged, as well as the number of visualizations within each classification and the number of classifications.

Visual Designs are a classification of the different types of visualizations that a user may choose. Within each Visual Design, there are a number of visualizations.

For example, the 'spatial' category can have retail store location maps or geographical location maps.

The visual design types include:

Hierarchical
Temporal
Spatial
Textual
Virtual
Structural
Classical
Pivotal
Navigational
Interactive 1. Hierarchical Visual Designs One purpose of a hierarchical visual design is to present large scale hierarchical data in one display. It is a picture for understanding, monitoring, exploring and analyzing hierarchical data.

Key elements of hierarchical visual designs are:

Data is hierarchical.

Structure of data can determine hierarchy.

They can be overlaid with connections.

This type of visualization may be automatically generated from a table of contents. This automatically generated hierarchy then becomes a special layer over which specific information can be overlaid.

The Hierarchical Visual Design is a hierarchical diagram such as an organizational chart or a correlation matrix.

This Visual Design has at least one natural centre and typically has a higher density toward the fringes of the visualization. The Hierarchical Visual Design can typically be considered as a 'free' structure. The nodes and vertices within the tree structure are best if they are generated automatically from a dataset. This tree structure is a good example of a Special Layer.

The development process will include building a tree that is optimized for this type of Visual Design including heat mapping techniques.

Large scale hierarchical data is represented using various techniques such as mapping to icons, shapes, colors and heights.

Typical uses include mapping of web pages, organizational charts, decision trees and menu options.

2. Temporal Visual Designs

One purpose of a temporal visual design is to present temporal based data, such as, for example, revenue per day, in a specially designed calendar or time series view. This calendar view will enable users to view thematic layers that display BPD information such as revenue or sales.

This type of visual design is a completely data defined Visual Design. The key input values are typically 'start' and 'end' dates along with the 'number' of variables to be displayed.

The simplest, and potentially the most useful, Visual Design Special Layer may be a carefully drawn calendar. The calendar may then become a useful Visual Design for date-based Visual Documents.

Temporal analysis is one of the fundamental methods of almost all analysis. Using temporal high density visualizations, users will be able to overlay high density Thematic Layers on well designed Special Layers such as the spiral data visualization shown in the above examples. This analysis can be applied in everything from customer frequency and spend analysis to analysis of the impacts of time of day on the management of a mobile phone network.

It is considered that temporal design patterns are particularly important in terms of analytics as the majority of analytics are time based. Described herein are several examples of producing temporal visual designs.

- Non Contiguous Time—For example, weekends can be represented in some interesting ways. The simplest way being not to show them.
- Non-linear Time—This allows multiple years of history to be shown where the oldest data is spatially compressed in the Visual Design.
- Temporal Special Layers—These can be used to compare quite disjointed types of data. For example, the relationship between external public events, operational payroll sizes and sales revenue. There exists no easy way to numerically join this data together, visually this data can be joined. The technique combines well with simple correlations as it is possible to combine these distinct datasets to show correlations.
- Control—One important consideration in visualizing temporal data is the gaining of scientific control. For example, seasonal variables. This is particularly interesting as one year is always different from the next. Quite simply, the start date of each year is never the same as the next, and moving external events such as Easter and 'acts of God' such as weather make precise comparison very difficult.

3. Spatial Visual Designs

One purpose of a spatial visual design is to present an overview of large scale numerical data in one spatial display (i.e. a space) for understanding, monitoring and analyzing the data in relation to a space.

This type of visual design combines together base maps provided by third parties with rendered thematic layers. These "mash-ups" are user definable and accessible to users.

For example, third party base maps may include customer-owned spatial maps or readily available base maps such as those provided by Google™ Maps or Yahoo™ Maps. The system provides powerful thematic layers over one of these spatial base maps.

One example of a spatial visual design is available at www.weather.com[iii]. This map shows two layers—(1) an underlying heat map overlaid with (2) actual temperature at specific cities. The points are useful as the state boundaries allow the user to determine with relative ease which city is being referenced. The underlying heat map is useful as it allows the user to see the overall trend at a glance.

A second example is available at Information Aesthetics[iv]. This example shows the travel time from the centre of London outwards using various methods of travel. The use of heat maps here shows very clearly the relationship between distance from the centre of London and travel time.

In a further example, the 'spatial' category of visual design can have retail store location maps, network maps or geographical location maps, such as, for example, maps available from Google™ or Yahoo™

Numerical data may be independently mapped using parameters such as hue, saturation, brightness, opacity and size distributed across a defined geographical space.

Geographic mapping has a wide range of uses. In fact with the wide availability of high quality base maps, the world is becoming spatially enabled. Mapping applications can be used for a huge variety of tasks, from customer relationship management to drive time analysis, site selection to insurance risk analysis and telecommunications network analysis.

4. Textual Visual Designs

One purpose of textual visual designs is to enable business users to interact and query seamlessly from the structured to the unstructured world.

While it is possible to do basic numeric analysis on variables such as hit frequency and number of clicks per hour, the key method is to use a special layer to construct a sensible schematic of the unstructured data then overlay BPDs. Simply put, the described solution will leverage information visualization to bring structure to the unstructured world.

For example, a heat map may be used as part of a textual visual design.

Unstructured textual information is a huge area of growth in data storage and intuitively, the business intelligence industry expects this data to become a valuable asset. The described solution provides information visualization capabilities that overlay and draw out the non-numeric, but actionable, observations relating to unstructured data, in order to link the numeric data warehouse to the unstructured world.

There are a multitude of Special Layers that may be used with textual data. These textual Special Layers extend from building self organizing maps of textual information to diagrams showing the syntax hierarchy of the words used in a document.

A self organizing map (SOM) consists of components called nodes or neurons. Associated with each node is a weight vector of the same dimension as the input data vectors and a position in the map space. The usual arrangement of nodes is a regular spacing in a hexagonal or rectangular grid. The self-organizing map describes a mapping from a higher dimensional input space to a lower dimensional map space. The procedure for placing a vector from data space onto the map is to find the node with the closest weight vector to the vector taken from data space and to assign the map coordinates of this node to our vector—Source: Wikipedia[v].

5. Virtual Visual Designs

One example of a virtual visual design is a 3D representation of a virtual environment. 3D worlds generate far more accurate and complete data than the real world. As these 3D worlds grow in popularity and become more immersive, the potential for business intelligence tools to be applied to this environment grows significantly.

One example application of the use of a virtual visual design is a retail space analysis tool where transaction data is under-laid as the color of the carpet or shelves. In the case of the shelves, the shelves can also show representations of the products on the shelves.

6. Structural Visual Designs

One purpose of a structural visualization is to illustrate the structure of the data. For example, network topology or interconnection between data elements. The interconnections in the examples below show how a simple Special Layer construct can be used to illustrate quite complex connections.

One example of a structural type visual representation is that of the London underground map. The London underground map is a key historic map showing the schematic topology of the London underground. Using this map travelers can intuitively plan out complex routes and interconnects. Without this visualization, navigating the London underground system would be significantly more difficult and complex to understand.

These structural visualizations are very powerful and are closely related to spatial visualizations. Most of the thematic treatments that can be applied to a spatial visualization are equally applicable to a structural visualization.

Examples of uses for such a visual design type would be for visualizing call routing across a network, electricity grid management and route optimization.

It will be understood that a wide variety of Special Layers may be created in this space. These Special Layers essentially generate the structural schematic from the base data.

Typically the interconnections between nodes are used to generate the structure. One important aspect of the structural Special Layer is building the structure in such a way that interconnect line crossing is minimized.

7. Classical Visual Designs

Traditional charts provide a simple, common and well-established way of presenting data using classical visual designs. However, traditional charts are user-skill dependent and the herein described system may be used to apply guided Visual Design techniques to traditional charts to significantly extend their usefulness.

One example would be to show a line chart of Speed Vs Time in a simple two dimensional line graph. This type of basic graph shows the data clearly and allows the user to observe any geometric trends.

Some common charts that fall into this design category are as follows:

- Scatterplots—Are Cartesian coordinates to show the relation of two or more quantitative variables.
- Histograms—Typically show the quantity of points that fall within various numeric ranges (or bins).
- Bar graphs—Use bars to show frequencies or values for different categories.
- Pie charts—Show percentage values as a slice of a pie.
- Line charts—Are a two-dimensional scatterplot of ordered observations where the observations are connected following their order.

8. Pivotal or Quartal Visual Designs

Different visualization methods have been suggested for high-dimensional data. Most of these methods use latent variables (such as principal components) to reduce the dimensionality of the data to 2 or 3 before plotting the data. One problem with this approach is that the latent variables sometimes are hard to understand in terms of the original variables.

The parallel coordinate (PC) scheme due to Inselberg and others attempts to plot multivariate data in a completely different manner. Since plotting more than 3 orthogonal axis is impossible, parallel coordinate schemes plot all the axes parallel to each other in a plane. Squashing the space in this manner does not destroy too much of the geometric structure. The geometric structure is however projected in such a fashion that most geometric intuition has to be relearned, this is a significant drawback, particularly for visualization of business data.

Pivotal or Quartal visual designs allow the user to display higher dimensional data in a lower dimensional plot by ranking and splitting variables across various axes. This method may for example be used to display 3D data in a 2D plot.

9. Navigational Visual Design Navigational visualizations use a highly visual interface to navigate through data while maintaining the general context of the data. This data visualization method may use other visual design types so it is differentiated more by the style of how it is used than the implementation standard.

Photosynth for example is a powerful navigational tool for moving between images, its display is designed for navigation of large numbers of linked images.

One illustrative navigational representation example is shown by Ubrowser. This navigational visualization example shows web pages represented in a geometry design. The web pages can be navigated through by spinning the cube shown in the example.

Navigational visualizations are designed for users to interactively move through the data. The objective of the visualization is to present a large volume of data in such a way as to enable users to move through the information and gain an understanding of how the data links together.

A number of display techniques are known for displaying information with regard to a reference image (the combination referred to as primary information). Where the limit of primary information is reached a user may wish to know more but be unable to further explore relevant information. A user may also simply wish to explore other aspects although there is more primary information to explore.

A key element of navigational visual designs is that they are interactive and are designed to assist in data navigation and data way-finding rather than for analytical purposes.

10. Interactive Visual Designs

This classification is for significantly advanced or interactive visual designs which do not fit within the preceding classifications.

These visualizations vary in nature from pure abstract forms to more tangible forms of visualizations. The key difference is that these visualizations may not be classified within the preceding Visual Design classifications due to their advanced nature or interactivity.

Any Visual Design layer considerations will be dependent on the interaction being considered.

There is opportunity to use common associations to provide iconic views of key events; the common associations are created using the interactive tools and asking users for feedback on the relevant icons. This feedback is then developed into a learned interactive system to provide iconic data representations.

Eye movement sensors can be used to control the interactivity and to learn information about relevant icon usage and control interactivity.

A wide range of user interfaces are used in conjunction with computer systems. Generally these are simply used to provide command or data inputs rather than to analyze the underlying behavior of a user in the context of the operation of a software application.

It would be desirable to operate software applications running on a computer on the basis of observed user behavior in the context of a software application.

Business Performance Drivers (and BPD Packages)

Business Performance Drivers (BPDs) are a metric applied to data to indicate a meaningful measurement within a business area, process or result. BPDs may be absolute or relative in their form of measurement.

The Business Performance Driver (BPD) concept differs from the known KPI concept by introducing BPDs that (1) may have multiple dimensions, (2) place the BPD in the context of the factors used to calculate them, (3) provide well understood points of reference or metadata around which visual document creation decisions can be made, and (4) may contain one or more methods of normalization of data.

Common groups of BPDs are called BPD Packages. For example, BPDs relating to one industry (say, telecommunications) can be grouped into one BPD Package. BPDs may be classified into one or more BPD Packages. For example, Net Revenue with normalizations available of per customer or per month may be applicable in a number of industries and hence, applicable to a number of BPD Packages.

Spatial Maps

Spatial maps allow for a user-owned and defined spatial map and/or for the user to use publicly available context maps such as Google™ Maps or Yahoo™ Maps. In either case, the user can display selected BPDs on the chosen spatial map.

Typically, a user-owned spatial map may be the inside floor space of a business and a publicly available context map may be used for displaying BPDs on a geographic region e.g. a city, county, state, country or the world.

Application Components

The described application includes two main components, the Application Servers and the Application Infrastructure.

The Application Server includes a number of servers (or server processes) that include the Rendering Engine (to make (or render) the Visual Documents), Metadata Servers (for the BPD Packages, the Visual Designs and the BPDs) and the Request Queue.

The Application Infrastructure is also comprised of a number of servers (or server processes) that may include a Listener (which 'listens' for document requests) and central error logging.

Based on the user selections made above (Visual Documents, Visual Designs and BPDs), the user can click on an action and send a communication to a third party system (CRM, Business Intelligence or other application). The third party system could, for example, load the list from the solution and then send out a personalized email to all members on that list.

According to one embodiment, the described server components of the application are a Java based application and utilize application framework such as the IBM™ WebSphere application server framework, other platforms and server applications may be utilized as alternatives. The client application may be a mashup that utilizes the server components or it could be a rich internet application written using the Adobe™ Flash framework.

Other key elements of the system may include:

Parallelism—Parallel processing to increase responsiveness or to increase workload scalability of queries or Visual Documents. This parallelism may also decrease response time for larger visual documents in particular animated images may be executed in a parallel fashion.

Security—System and user-access security. This security may be a combination of authorization and authentication. The security framework may be implemented using the application framework.

Map Updates—A map management tool to update user-owned spatial maps.

Predictive Modeling—This may be an interface to third-party predictive models.

Configuration Tools—The application may be supported by configuration tools to enable rapid deployment of the application.

Modular Overview

Module Descriptions

Figure 2B:
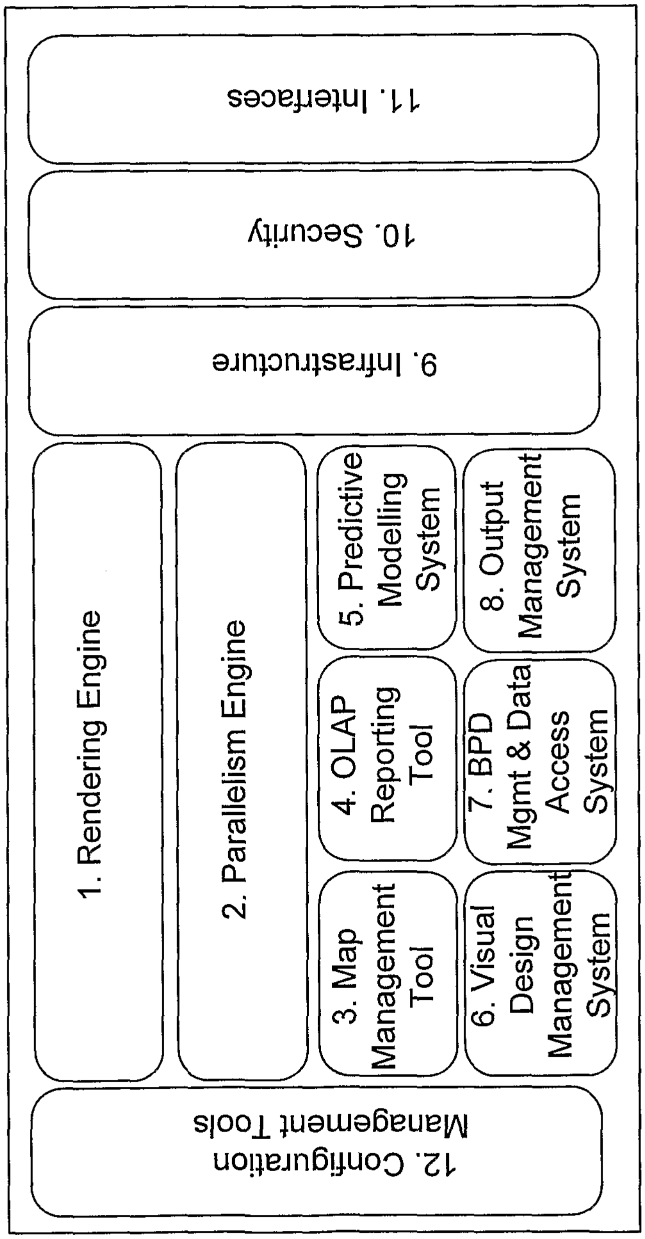
FIG. 2B shows an overview of the software modules in the described system.

The diagram shown in FIG. 2B shows an overview of the software modules in the described system.

These modules are described in the subsequent table. More detailed descriptions and diagrams of each of the software modules are provided below.

The table below outlines the following four items in relation to each module:

1. Technology System Component: This is the name given to the system component; this name matches the name in the above diagram.
2. High Level Functional Description: Describes the role of the software module.
3. Caching: Indicates whether this module uses caching to optimize performance.

| Technology System Component | High Level Functional Description | Caching |
|---|---|---|
| 1. Rendering Engine | Produces images and animations; could use Google ™ Maps or Yahoo ™ Maps for spatial context map. The development of Special Layers enables Visual Document produced to have unique capabilities that were not previously readily available. | Yes |
| 2. Parallelism Engine | Enables parallel execution of requests for high volume of Visual Document output and rapid results delivery to users. The preferred application framework selected is the IBM ™ WebSphere product. This framework enables the application to be scaled across multiple servers. | Yes |
| 3. Map Management Tool | Provides key map editing features (specifically CAD like) and map version control (desktop and enterprise) tools. | Yes |
| 4. OLAP Reporting | Industry standard online analytical reporting. For example, sorting, filtering, charting and multi-dimensional analysis. It is desirable that the user interaction with the data selection process in the data view is seamless with the data visualization view. For example, if the user selects 5 customers from the data view, the same 5 customers should be selected in the visualization view. This means that the solution may be a hybrid view (as discussed later). This hybrid view is a 'simple' view and is an interface to an industry leading OLAP tool. One option includes interfacing to the OLAP tool via a JDBC interface from the described solution or a web service model for the selection management. | Yes |
| 5. Predictive Modeling System | An interface to external predictive modeling engines; may also have some modeling systems. For example, Self Organizing Maps (SOM). | Yes |
| 6. Visual Design Management System | Tools for users to manage the different Visual Designs. | No |
| 7. BPD Management and Data Access System | Tools for users to manage the different BPD Packages and their associated BPDs. Contains Data Access capability that enables data to be queried from RDBMS (or potentially other data sources). | No |
| 8. Output Management System | For management of the documents (Visual Documents) within the system. | Yes |
| 9. Infrastructure | Core system management functions including system logging and Request Queue management. The Request Queue is also described under parallelism and there may be crossover between these two module descriptions. | Yes |
| 10. Security | Enables access to the system (or parts thereof) to be properly controlled and administered. | No |

-continued

| Technology System Component | High Level Functional Description | Caching |
|---|---|---|
| 11. Interfaces | Allows services to be called by (or to call) external applications. | No |
| 12. Implementation Tools | Tools to deploy and configure the software system. | Yes |

Architectural Views Of The System

This section contains descriptions and diagrams of the architectural views of the system. The architecture shows how the system components fit and operate together to create an operational system. If compared to a vehicle, the wiring diagrams, the physical body, the driving circle and key complex components like the engine would be shown in architectural views.

This view does not describe how the system is written; it describes the high-level architectural considerations.

Architectural considerations are typically implemented by one or more software modules. The modular view described herein lays out a high-level view of how the software modules are arranged.

Figure 3:
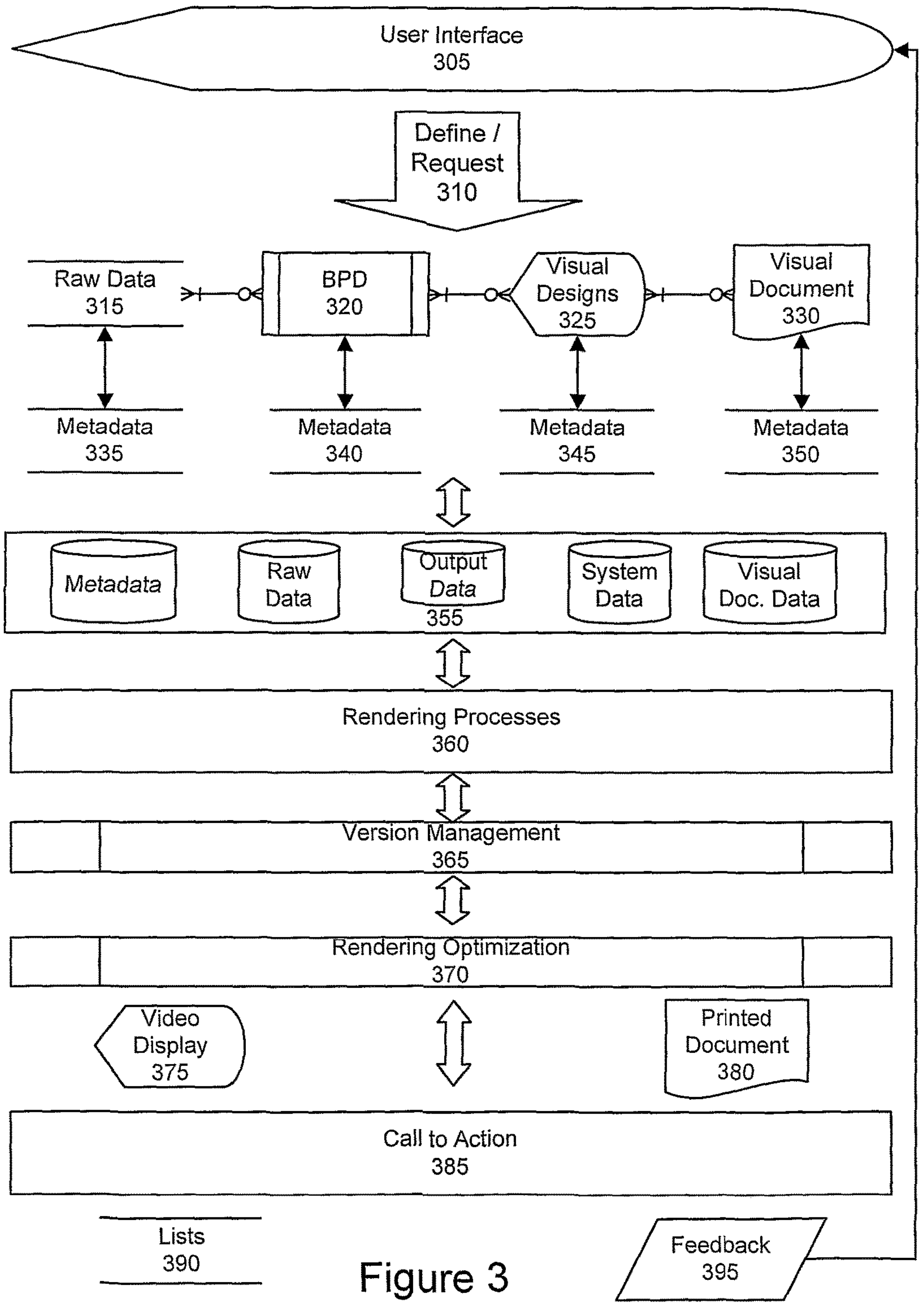
FIG. 3 shows a general overview of the data flow within the system according to an embodiment of the present invention.

FIG. 3 shows a general overview of the data flow within the system.

Figure 4:
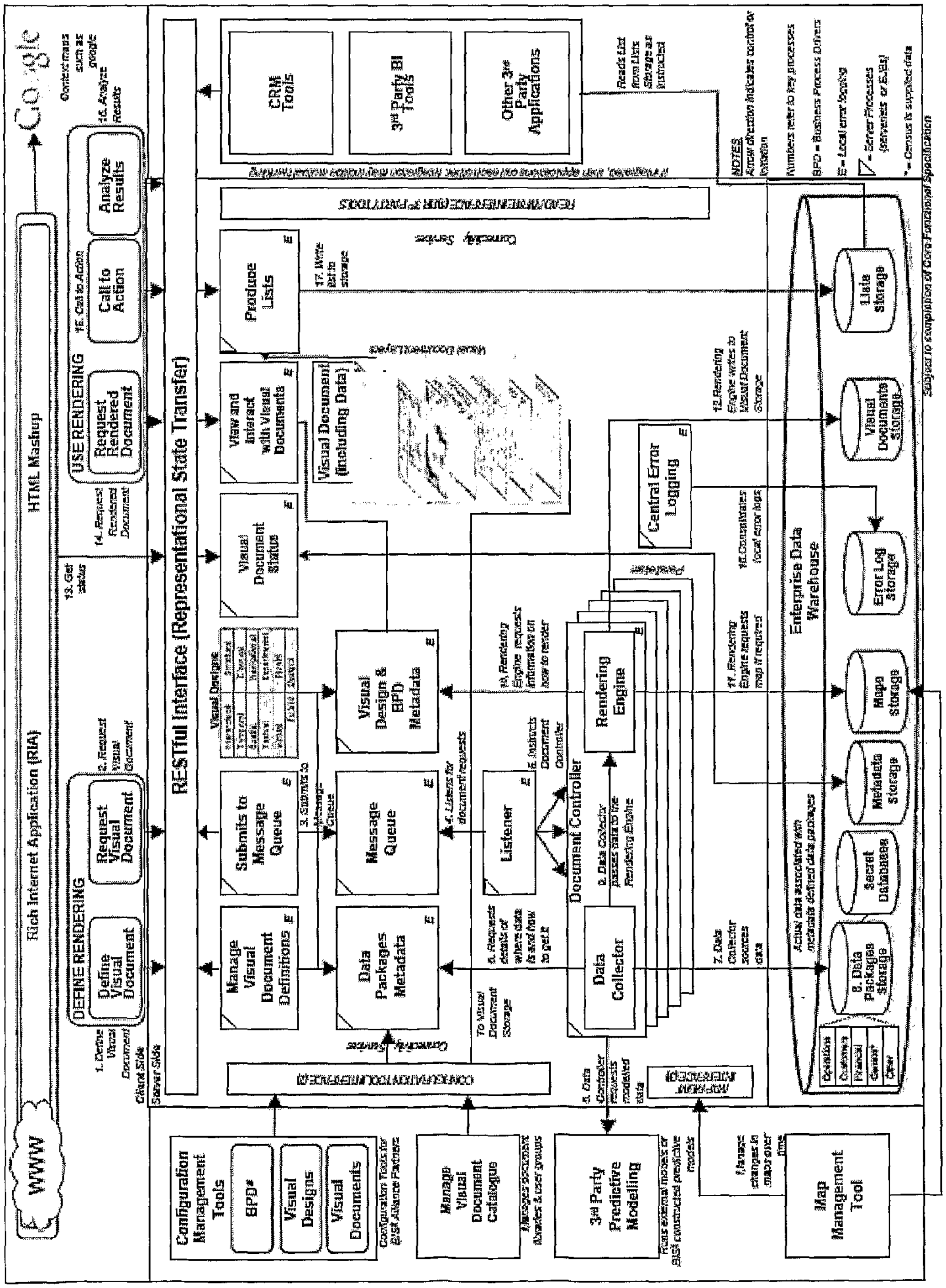
FIG. 4 shows an architectural overview of the described solution according to an embodiment of the present invention.

FIG. 4 shows the architectural overview of the described solution. This diagram is elaborated by the diagrams and descriptions in following sections of this document.

The following modules or components are shown:

Web interface Module 4105: User interfaces are browser based or may be a web services client, a rich internet application or may be a thick client. In all cases the user interface uses the same interface to the back end services.

Rendering Definition Module 4110: The user interface is used to define and request the rendering of Visual Documents Rendering Use Module 4115: Visual Documents are used for analysis, and precipitate calls to action.

Connectivity Services Module 4120: The definition and rendering of Visual Documents is performed through a set of programs or services called the Connectivity Services.

Configuration Management Tools Module 4125: Multiple versions of the basic elements; BPD, Visual Design, Visual Documents; are managed by a set of programs called the Configuration Management Tools.

Visual Document Management Catalog 4130: One such Configuration Management Tool (4125) is a set of programs that manage a users' catalog of available Visual Documents.

Predictive Modeling Module 4135: Predictive modeling is used for forecasting unknown data elements. These forecasts are used to predict future events and provide estimates for missing data.

Map Management Tool 4140: Another of the Configuration Management Tools (21125) is the Map Management Tool. It is designed to manage versions of the spatial elements of a visual design such as a geographic map or floor plan.

Visual Document Definitions Management Module 4145: Visual Document Definitions are managed through the use of metadata (4175).

Message Queue Submission Module 4150: Requests for Visual Documents are handled through queued messages sent between and within processes.

Visual Design Type Module 4155: Visual Documents are comprised of one or many Visual Designs in these categories.

Visual Document Status Module 4160: The status of Visual Documents is discerned from the metadata and displayed on the user interface.

Interaction and Visual Document View Module 4165: The user interacts with the Visual Documents through the user interface, and appropriate changes to and requests to read are made to the metadata.

List Production Module 4170: Where additional output such as customer lists are required, they are requested using the user interface and stored in the EDW (4215).

Data Packages Metadata Module 4175: Metadata is used to describe and process raw data (data packages).

Message Queue Module 4180: Messages may be queued while awaiting processing (4150).

Visual Design and BPD Metadata Module 4185: Metadata is used to describe and process the BPD's and Visual Designs associated with a particular Visual Document.

Visual Documents Module 4190: Visual Documents may be comprised of layered Visual Designs.

Third Party Modules 4195: Visual Documents may be used with or interact with other third party tools.

Listener Module 4200: The listener processes messages (4150) in the message queue (4180)

Document Controller Module 4205: The document controller is used to provide processed data to the rendering or query engines.

Central Error Logging Module 4210: System errors are detected and logged in the EWP (4215).

EDW 4215: All data is typically stored on a database, typically, multiple fault tolerant processors in an Enterprise Data Warehouse.

The following architectural components are described in more detail.

| Architectural Component | Description |
|---|---|
| Connectivity Services | This is a common communication service that is used when sending messages between systems (i.e. the described solution and 3rd party tools) and between the described application layer and the user interface layer. |
| Configuration Management Tools | Allows specialized users to configure Visual Designs and Visual Documents to their needs - which differ from the default configuration provided. |
| Manage Visual Document Catalog | Gives selected users the ability to search, sort, group, and delete Visual Documents in the Visual Document Catalog. |
| Predictive Modeling | External modeling systems that use data sent from the described solution to perform complex calculations to produce predictive data. This predicted data is piped through the described solution to the user. |
| Map Management Tool | This is an application that enables users to create modify and delete individual maps to manage the complete sequences, this is very appropriate for management of floor plans. |
| Data Packages Metadata | The services responsible for providing metadata that enables the requester (typically, Data Collector) to source the data for the BPD. |
| Visual Design & BPD Metadata | The services responsible for providing the metadata to the requester (typically the Rendering Engine) that enables the construction of the Visual Documents. |
| Request Queue | The Request Queue manages the communication of requests for rendering of Visual Documents. These communications may be scheduled. |
| Document Controller | The Document Controller consists of two components. The first is the Data Collector responsible for reading the appropriate metadata and retrieving the data from the EDW (Enterprise Data Warehouse). This data is passed to the Rendering Engine that is responsible for producing the Visual Document. Document Controllers run parallel Visual Document requests, build and store documents. |

-continued

| Architectural Component | Description |
| --- | --- |
| Read/Write Interface for 3rd Party Tools | The described solution provides a common interface for 3rd party tools to communicate with e.g. CRM applications. |
| 3rd Party BI Tools | One of the 3rd party tools that the described solution may integrate with is an external OLAP tool. |
| Secret Databases | Secret databases are a method of sharing encrypted databases and providing a SQL interface that enables end users to run queries against atomic data without discovering the details of the data. |

The following terms have been also been used in FIG. 4. These are explained in more detail below.

| Architectural Component | Description |
| --- | --- |
| Logging | Logging (for example, error logging and access logging) is an inherently difficult activity in a parallel independent and predominantly stateless system.<br>The main issue that arises is that logging presents potential links between systems and therefore dependencies.<br>Typically within the application, each server will be responsible for its own logging. This ensures that the system scales without degradation in performance.<br>A separate process (central log reader) may be used to consolidate these logs dynamically as and when required. |
| Web Server | Web Servers respond to requests from users to provide Visual Documents. They read any required information from the metadata servers and Visual Document storage servers. If necessary they write Visual Document requests to the Request Queue. |
| Metadata Servers/Storage | Metadata servers are responsible for storage and user views of metadata. The metadata servers are also responsible for the validation of user rights to read Visual Documents (within the application). |
| Visual Document Storage | The Visual Document Catalog is a secure storage for all Visual Documents. Access is only possible when security requirements are met. |
| Data Collector | Typically the data collector queries the customer's data warehouse. The data warehouse can be augmented with additional subscribed embellishment data. This will provide the raw data that is represented visually back to the user. |
| BPD Packages Metadata | The described solution will use metadata to define groups of BPDs. These groups of BPDs are called BPD Packages. BPD Packages enable both internal data measures to be efficiently installed and external datasets to be provided.<br>BPD packages contain no data. |

Figure 5:
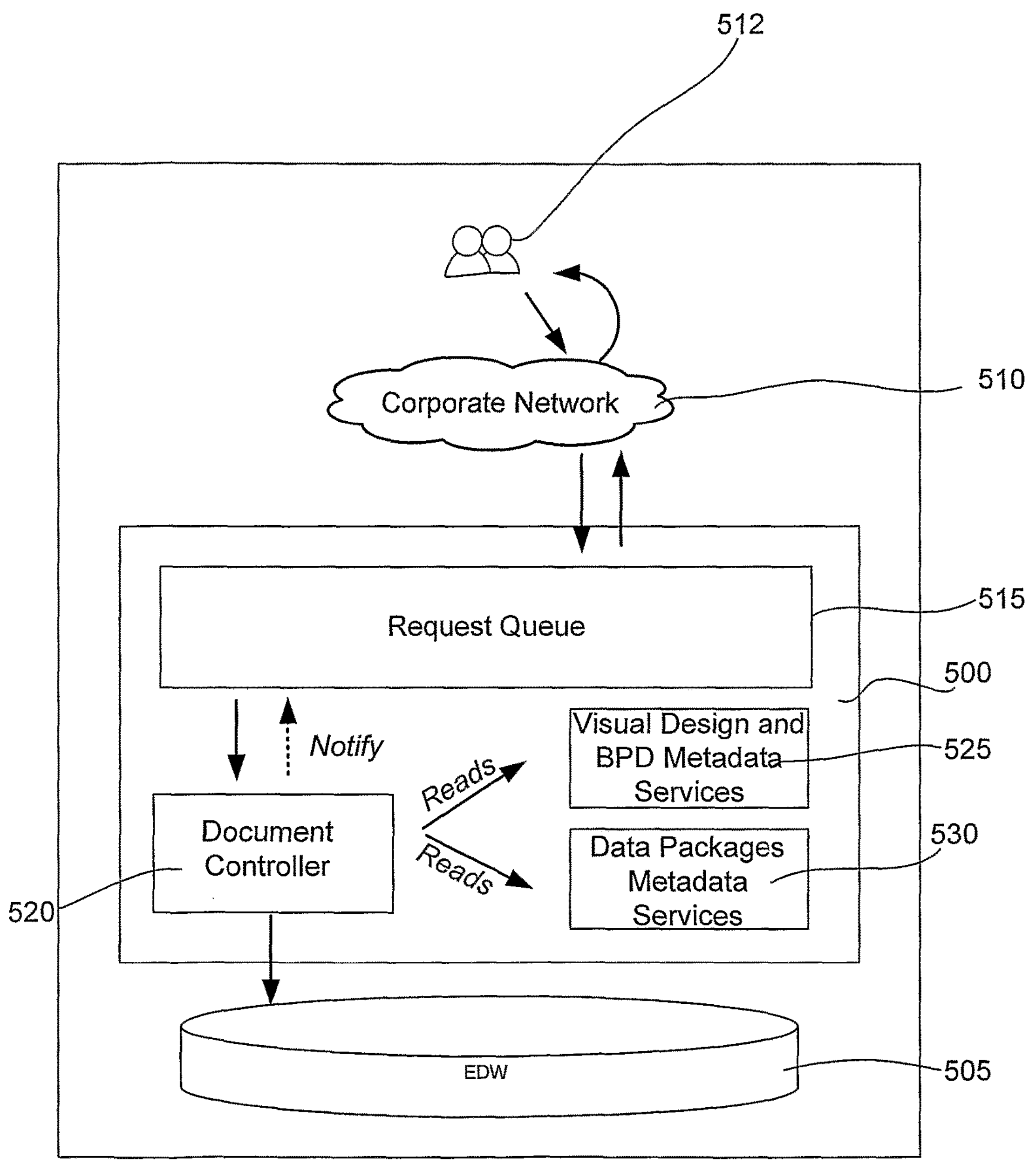
FIG. 5 shows a high-level system delivery overview of the described solution according to an embodiment of the present invention.

A further high-level system delivery overview of the solution is set out as shown in FIG. 5.

The described solution 500 is hosted by the enterprise 510. The figure shows the logical flow from the submission of a request to the end result, viewing the rendered Visual Document.

The data being visualized belongs to the customer 512 and the submitted request is unknown to the entity running the visualization system 500.

The controlling entity, integrators and customers may wish to have summaries of technical performance data (usage patterns, errors etc) sent from the operational system back to the integrator or controlling entity.

The system 500 has access to the data in a EDW 505. The system utilizes a request queue 515 to control requests from a corporate network 510. These requests are forwarded to a document controller 520. The document controller 520 accesses both the EDW 505 and reads visual designs and BPD metadata services 525, as well as data packages metadata services 530.

The system described thus enables various methods to be performed. For example, data is transformed into visually interpretable information. The visually interpretable information is in the form of visual representations that are placed within one or more visual documents.

Figure 6A:
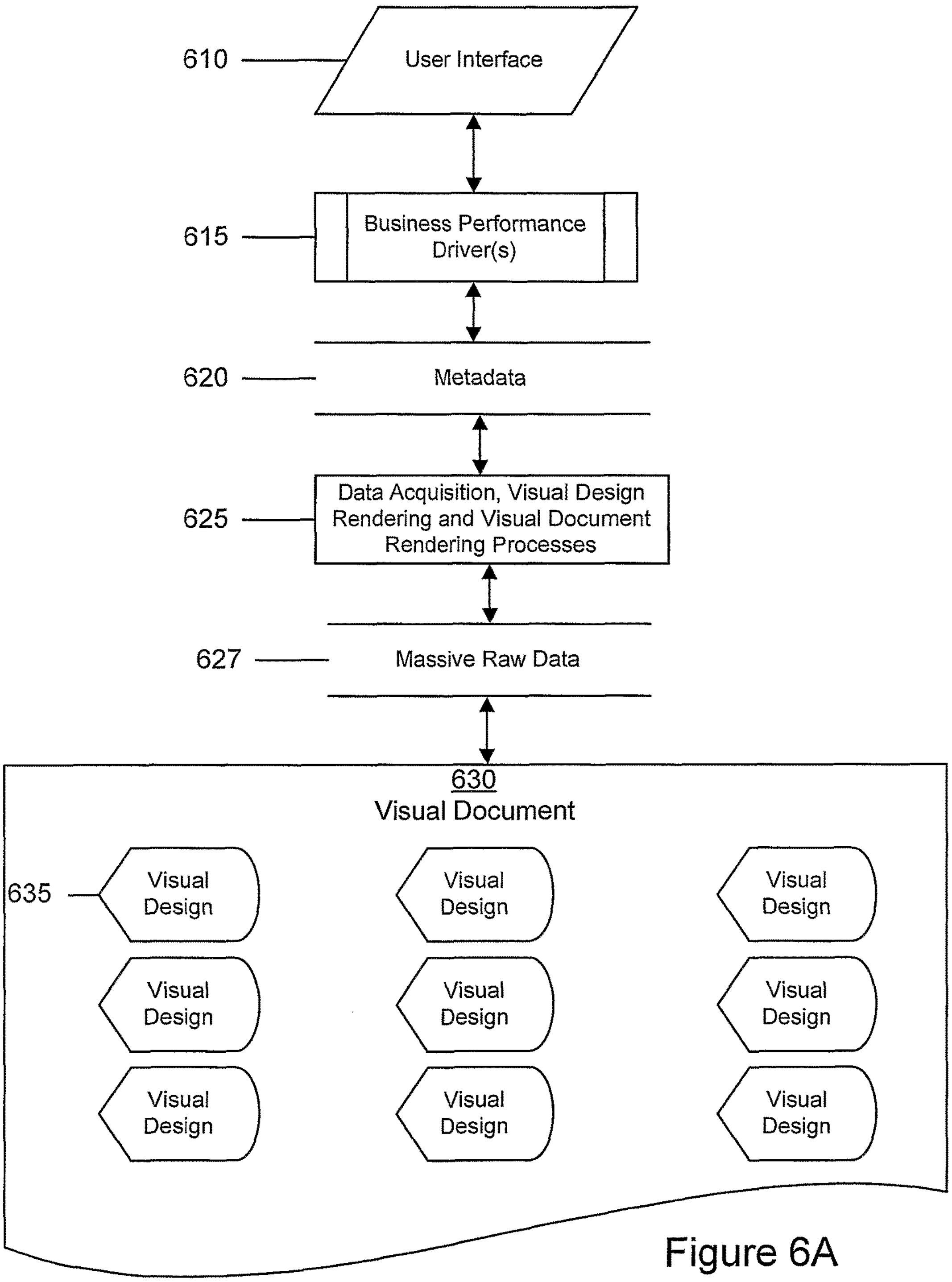
FIG. 6A shows a general data flow diagram according to an embodiment of the present invention.

FIG. 6A shows a general data flow diagram for the described system.

The User Interface 610 allows the user to define BPD's 615 in terms of raw data 627, which become the focus of the Visual Document 630.

Further, the User Interface 610 allows the user, through automated expert help, to create the Metadata 620, the most appropriate Visual Designs 635 that make up the Visual Document 625 in order to provide detailed analysis of data related to the BPD 615. The data acquisition, visual design rendering and visual document rendering processes utilize massive amounts of raw data 627.

The Metadata 620 is used by the Processes 625 to optimize the acquisition of the appropriate Data 627, processing of the data into useful information, and to optimize the creation and rendering of the Visual Designs 635 and the Visual Document 630 that contains them.

This method includes the steps of providing comprehensive yet easy to understand instructions to an end user that has accessed the system and the visual design application. The instructions assist the end user in obtaining data associated with a theme, wherein the theme may be focused on objectives that have been derived from the data. The objectives may be business objectives, for example. In this way, the system guides a user carefully through the many choices that are available to them in creating the visual representations, and the system automatically tailors its instructions according to not only what the user requires, but also according to the data that is to be represented. The system focuses on providing instructions to enable a visual representation to be created that will enable an end user to more effectively understand the data that has been collated. Further, the instructions assist the end user in determining one or more summaries of the obtained data that enable the end user to understand the theme, as well as organizing the determined summaries into one or more contextual representations that contribute to the end user's understanding of the theme.

Further, instructions are provided that assist an end user in constructing one or more graphical representations of the data, where each graphical representation is of a predefined type, as discussed in more detail below, and includes multiple layers of elements that contribute to the end user's understanding of the theme.

Finally, instructions are provided to assist an end user in arranging the produced multiple graphical representations in a manner that enables the end user to understand and focus on the theme being represented as well as to display or print the organized graphical representations. The system assists in the organization or arrangement of the representations, elements thereof, within the visual document so as to ensure certain criteria are met, such as, for example, providing a suitable representation in the space available, using the minimum amount or volume of ink to create the representation, and providing a suitable representation that depicts the theme in a succinct manner, or visually simplistic manner.

The data being processed to create the graphical representations may be particularly relevant to the theme being displayed, disparate information or indeed a combination of relevant and disparate information.

There are multiple types of graphical representations that may be included within the visual document. The types are discussed in more detail below and include a hierarchical type, a spatial type, a virtual type, a classical type, a navigational type, a temporal type, a textual type, a structural type, a pivotal type, and an interactive type.

Further, the instructions may assist an end user in arranging the graphical representations in order to display high density data in a manner that conveys important information about the data, rather than swamping the end user with multiple representations that look impressive but do not convey much information.

In addition instructions may be provided to assist the end user in arranging the graphical representations to allow supplementary information to be added, where the supplementary information may be provided in any suitable form. Particular examples provided below depict the supplementary information being provided in subsequent visual layers that overlay the graphical representation. Alternatively, or in addition, supplementary information may include additional elements to be displayed within a single layer of the representation, for example, in the form of widgets.

Figure 6B:
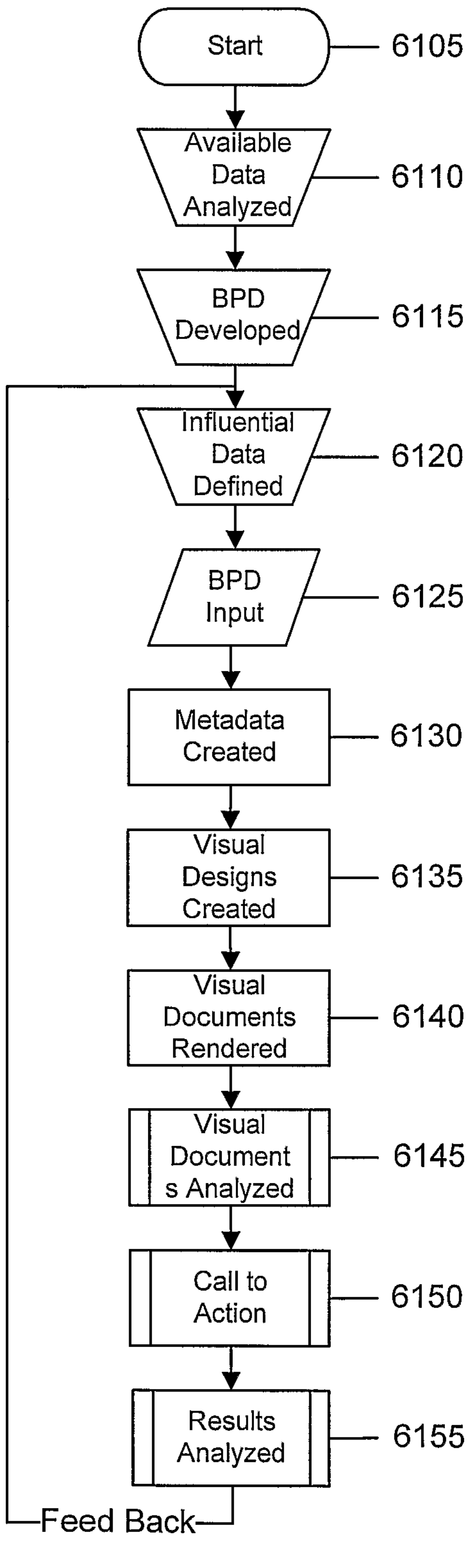
FIG. 6B shows a flow diagram according to an embodiment of the present invention.

FIG. 6B shows a flow diagram according to this embodiment of the invention.

Step 6105: Process Starts. User decides to manage the business.

Step 6110: Available data is identified and analyzed.

Step 6115: Business Process Drivers (metrics defined in terms of the data to indicate a meaningful measurement within a business area, process or result).

Step 6120: Data influencing the BPD metrics are identified.

Step 6125: BPD's are input into a computer system

Step 6130: BPD is categorized and appropriate metadata describing it is generated.

Step 6135: Visual Designs to display the influential data are created.

Step 6140: Visual Designs are aggregated into Visual Documents and rendered. Adjustments are made based on the freshness of all components (e.g., BPD, available data).

Step 6145: Visual documents are analyzed by the end user.

Step 6150: The end user decides on and implements actions based on the analysis in 6145.

As touched on above, business performance drivers (BPDs) are used to enable more efficient data analysis so as to produce accurate and relevant visual representations of the data. A BPD is a form of advanced business measure wherein additional information is included within the BPD that enables the system using the BPD to understand how to manipulate the BPD. That is, one or more intelligent attributes are included with the business measure to form the BPD, where those attributes reference or include information on how the BPD is to be processed or displayed. The form of processing and display may also be varied according to the device type or media upon which the business measures are to be displayed.

The attributes are attached to the business measure by storing the BPD in the form of a mark up language, such as, for example, HTML or XML. It will however be understood that any other suitable format for storing the BPD may be used where the attributes can be linked to the business measure.

In the example of HTML, the attribute is included as a tag. One such example would be to include the data or business measure within the body of the HTML code and follow the business measure with a tag that references the attributes, or dimensions, associated with that business measure.

Further, the attributes may also be modified or deleted, or indeed new attributes added, during or after the processing of the BPD so that the attributes are maintained, or kept up to date, bearing in mind the requirements of the entity using the BPD to visualize their data.

The business performance drivers, or measurable business objectives, are identified in order to create graphical representations of the business objectives, where those representations are placed within a visual document. A business objective may be, for example, a metric associated with a business.

Instructions are provided by the system to the end user, in order to assist the end user in establishing multiple business objectives as functions of available metrics, as well as assisting the user in organizing the business objectives into a contextual form that contributes to the end user's understanding of the business objectives.

Further, instructions are provided to assist the end user in constructing one or more graphical representations of the business objectives, where each graphical representation is of a predefined type, as mentioned above and described in more detail below. Further, each graphical representation includes multiple layers of elements that contribute to the end user's understanding of the business objective.

The elements within the graphical representation may include, for example, a shape, position, color, size, or animation of a particular object.

Instructions are also provided by the system to assist the user in arranging multiple graphical representations in a suitable manner that enables the end user to understand and focus on the business objectives being represented.

Finally, the end user is also assisted with instructions on how to display the organized graphical representations.

The following section describes a method of creating a visual representation of data in the form of a visual design.

The method includes the steps of the system providing instructions to an end user to assist the end user in constructing multiple graphical representations of data, where each graphical representation is one of a predefined type, as defined above and explained in more detail below, and the graphical representation includes multiple layers of elements that contribute to the end user's understanding of the data The system also provides instructions to an end user that assist the end user with arranging multiple graphical representations of different types within the visual representation in a manner that enables the end user to understand and focus on the data being represented, as well as providing instructions to assist the end user in displaying the visual representation in a suitable manner.

The visual representation may be displayed in a number of different ways, such as on a color video screen or a printed page. The information that is forwarded to the display device to create the visual representation may differ according the type of display device so that the visual representation is produced in the best known suitable manner utilizing the advantages of the display device, and avoiding any disadvantages.

The data being displayed may be based on a measured metric or an underlying factor that affects a metric.

The elements within the graphical representation may include a shape, position, color, size or animation of a particular object.

Although a single visual document may include only one type of graphical representation, either in the form of multiple graphical representations or a single representation, there will also be situations where multiple types of graphical representations may be organized within a single visual document in order to convey different aspects of the data, such as, for example, temporal as well as spatial information. The inclusion of different types of graphical representations within a single document can provide an end user with a better understanding of the data being visualized.

Further, the single visual representation may be arranged to be displayed as an image on a single page or screen. This may be particularly useful where space is at a premium yet the user requires the visual representation to be provided in a succinct manner. For example, the user may request certain information to be displayed in a visual representation on a single mobile telephone display, or a single screen of a computer display, in order to show a customer or colleague the results of a particular analysis without the need to flick between multiple screens which can result in confusion, a waste of energy and ultimately a loss of understanding of the visual representations.

The same issue applies to printed representations, where the result of the system enabling a user to arrange a single representation, which may include multiple elements or layers, on a single page not only succinctly represents the data being analyzed but also saves the amount of paper being printed on and the amount of ink being used to print the document.

Further, the amount of ink required for a visual representation may be further reduced by providing instructions to the end user in a manner that directs them to control and use white space in a representation in an efficient manner so as to reduce the requirement of ink.

Multiple types of graphical representations may be merged together within a single visual document, or representation.

As mentioned above, instructions can be provided by the system to assist the end user in adding supplementary information to the visual representation, and the supplementary information may be provided in layers within the representation.

Visualization Framework

The following description provides the visualization framework that will support embodiments of the present invention. The description includes an overview of the importance of Visual Design including a brief historical recount of a world-recognized leading visualization. The description also sets out the Visual Design classifications for the described solution.

It will be understood that the Visual Design examples described in this section are examples for illustrative purposes to identify the concepts behind how the visualization is produced. Therefore, it will further be understood that the concepts described can produce visual designs different to those specifically described. The Visual Design examples shown are also used to help the reader understand the narrative describing the Visual Designs.

The system described is specifically adapted to create actual specific visualization designs relevant to selected vertical and horizontal industry applications being deployed.

A vertical industry application is one that is associated with a solution directed at a specific industry, such as, for example, the entertainment industry. In this example, BPDs relevant to that industry are created, such as rental patterns of movies over different seasons.

A horizontal industry application is one that is associated with solutions across multiple industries. For example, the BPD may be based on CRM analytics, which applies across a whole range of different industries.

Design is now a fundamental part of almost every aspect of how people live work and breath. Everything is designed from a toothbrush to every aspect of a web site. Compare visual design to architectural design—in both cases anybody can draw quite complex pictures. The resulting pictures could have stimulating and well drawn graphic elements. In both cases, the question is why does the world need designers? Exploring this question more deeply one can ask—does it make such a difference to how one perceives and understands a design when it is made by a professional rather than an amateur?

The trend in business intelligence is to design tools to provide flexibility and leave the world of visual design to the amateurs. Stephen Few comments in Information Dashboard Design[vi] that "Without a doubt I owe the greatest debt of gratitude to the many software vendors who have done so much to make this book necessary by failing to address or even contemplate the visual design needs of dashboards. Their kind disregard for visual design has given me focus, ignited my passion, and guaranteed my livelihood for years to come."

Visual Designs within the described framework are well thought through in how the data is displayed. The described system allows good information visualization design concepts to be captured and delivered back to users as Visual Documents using unique data processing and analysis techniques.

Visual Designs

Method or Visual Design Classifications

According to this embodiment, ten Visual Design types are defined and incorporated into the described system. It will be understood that additional Visual Designs may be further defined including the creation of certain examples and actual Visual Designs for specific industry applications.

The visual design types include:

Hierarchical
Temporal
Spatial
Textual
Virtual
Structural
Classical
Pivotal
Navigational
Interactive The following describes a method for the assessment of Visual Design quality. In assessing the quality of a Visual Design the following factors should be considered:

- Alternative approaches—To assess the capability of a Visual Design it is important to contrast it with other visualization methods. In particular one should compare the visual design to a classical graph or table of numbers. This comparison is important as many data visualizations add considerable graphic weight but little informational value.
- Visual simplicity—Looking at a visualization should not overload the mind. The simplicity of the visualization is important as it enhances interpretation and allows common understanding without training. Some visualizations require considerable training to be applied. In general, the described solution will not use these visual designs.

Data density—the density of data in a visualization is a critical measure of its overall value. Higher density visualizations, if successful in maintaining their simplicity, have considerable potential to increase the flow of information to end users.

Volume of ink used—Is the visual design using negative space to show key information? This use of negative space allows lower volumes of ink to be used while showing the same or higher density of information. In addition, ink required is generally reduced as the number of "views" or pages of data is reduced to convey the same volume of data.

Capability to be illuminated with detail—In the end, data visualization becomes information visualization when the specific details are shown. The ability of a visualization to hold detailed information in specific places, often achieved with labels, is a key element in determining its value as an information visualization.

Visual Design Layers

Figure 7:
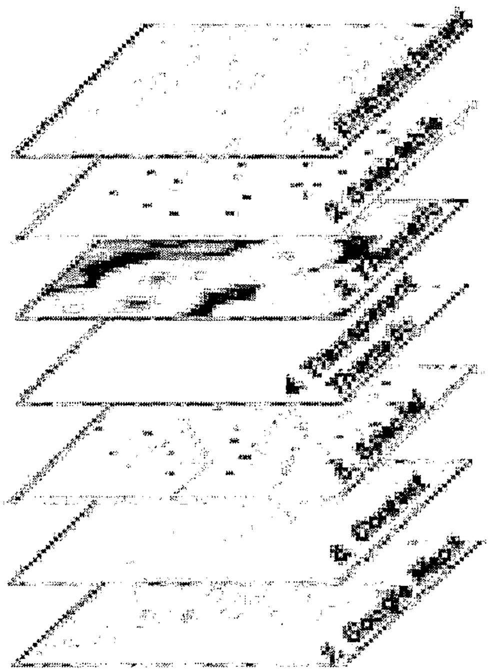
FIG. 7 shows the concept of layers according to an embodiment of the present invention.

There are seven defined Visual Design Layers which are set out diagrammatically as shown in FIG. 7. Other visual design layers may be added as appropriate.

These seven Visual Design Layers are described in the following table:

| Visual Design Layer Type | Description |
|---|---|
| 1. Embellishment Layers | Embellishment Layers have labels, symbology and/or other detailed information that is used to illuminate information that is displayed in the lower layers. The overlay can also include controls such as progress bars or spark-lines. |
| 2. Selectable Layers | Selectable Layers are interactive and consist of items that can have associated data. On a retail spatial map it includes store locations as they have associated data. Selectable Layers are typically not obscured by thematic treatments. |
| 3. Thematic Layers | Thematic Layers overlay colors or heatmaps on Special Layers. These thematic treatments become the core visual impact of the final Visual Document. |
| 4. Transparent Thematic Layers | Transparent Thematic Layers are very similar to Thematic Layers (in fact are an alternative). The only difference is that they are graphically merged using a transparent overlay. For example, this kind of layer is necessary to overlay heatmaps on maps.google.com. |
| 5. Special Layers | Special Layers construct the structure of the data. Specifically the Special Layer understands how to automatically draw the data so that other thematic treatments can be applied. Special Layers include mundane layers such as layers of polygons. |
| 6. Context Layers | These are the lowest level of the visualization; they include background maps and other contextual information. |
| 7. Context Map Layers | This is a type of context layer that is rendered from a map such as Google ™ Maps, Yahoo ™ Maps etc.<br>This may be a road map, satellite map or any other map. It is past as a set of tiled images and as such can only be used as a Context Layer. Typically, a Transparent Thematic Layer will be used to display thematic data on a context map layer. |

In terms of the Special Layer, two examples of Special Layers are set out below:

A. Classic Example of Special Layer: Voronoi Diagram

Source: Wikipedia[vii]

In mathematics, a Voronoi diagram, named after Georgy Voronoi, also called a Voronoi tessellation, a Voronoi decomposition, or a Dirichlet tessellation (after Lejeune Dirichlet), is a special kind of decomposition of a metric space determined by distances to a specified discrete set of objects in the space, e.g., by a discrete set of points.

In the simplest and most common case, in the plane, a given set of points S, and the Voronoi diagram for S is the partition of the plane which associates a region V(p) with each point p from S in such a way that all points in V(p) are closer to p than to any other point in S.

A Voronoi diagram can thus be defined as a Special Layer, where a set of polygons are generated from a set of points. The resulting polygon layer can then be subjected to thematic treatments, such as coloring.

B. Non Traditional Example of a Special Layer: Calendar

A calendar can be generated as a Special Layer for display of a temporal visual document. This Special Layer would require a 'start date' and an 'end date', most other information regarding the nature and structure of the Calendar could be determined automatically. The thematic layers would then use the structure of the calendar as a basis for thematic treatments such as coloring and contouring.

In an example from ENTROPÍA[viii] a calendar is shown that can be created into a spiral. The structure and layout of this spiral will be the subject of considerable design discussions by information designers focused on issues such as aesthetics and clarity of information. The result of this discussion is a visual design of a spiral calendar Special Layer. This Special Layer can then be used for thematic treatments such as coloring.

It will be understood that the system herein described includes one or more elements that are arranged to perform the various functions and methods as described herein. The following portion of the description is aimed at providing the reader with an example of a conceptual view of how various modules and/or engines that make up the elements of the system may be interconnected to enable the functions to be implemented. Further, the following portion of the description explains in system related detail how the steps of the herein described method may be performed. The conceptual diagrams are provided to indicate to the reader how the various data elements are processed at different stages by the various different modules and/or engines.

It will be understood that the arrangement and construction of the modules or engines may be adapted accordingly depending on system and user requirements so that various functions may be performed by different modules or engines to those described herein.

It will be understood that the modules and/or engines described may be implemented and provided with instructions using any suitable form of technology. For example, the modules or engines may be implemented or created using any suitable software code written in any suitable language, where the code is then compiled to produce an executable program that may be run on any suitable computing system. Alternatively, or in conjunction with the executable program, the modules or engines may be implemented using any suitable mixture of hardware, firmware and software. For example, portions of the modules may be implemented using an application specific integrated circuit (ASIC), a system-on-a-chip (SoC), field programmable gate arrays (FPGA) or any other suitable adaptable or programmable processing device.

The methods described herein may be implemented using a general purpose computing system specifically programmed to perform the described steps. Alternatively, the methods described herein may be implemented using a specific computer system such as a data visualization computer, a database query computer, a graphical analysis computer, a gaming data analysis computer, a manufacturing data analysis computer, a business intelligence computer etc., where the computer has been specifically adapted to perform the described steps on specific data captured from an environment associated with a particular field.

The system described herein adjusts the “actual win” value to provide what has been termed an “expected win” value that takes into account various forms of gaming accounting (such as behavioral interactions) in order to avoid the distortion in the win values calculated.

Further, the way a customer interacts, in a behavioral sense, with the gaming asset in relation to these forms of gaming accounting may be measured and used to calculate how a gaming asset’s use and profitability is affected in different scenarios.

The system herein described can be utilized to calculate an expected win value by using behavioral interaction data based on behavioral interactions that indirectly affect the profitability of a gaming asset. For example, the behavioral interaction data may be related to the use of non standard, non-monetary, or indirect gaming accounting forms.

Intelligent data collectors can be utilized to monitor the behavioral interactions of customers. Data in various different forms may be collected from various devices, such as one or a combination of, for example, video data from in-house camera devices for monitoring location and movement, audio data from audio and speech recognition devices for detecting specific levels of noise and excitement or the utterance of certain words that indicate a certain reaction, tracking data from RFID and Bluetooth devices to track the movement of electronic devices and RFID tags, tracking data from mobile telephone tracking systems, identity recognition data from, for example, face recognition technologies to identify individuals and to detect certain emotions, and movement data using gait measurement technologies to detect emotions based on how a customer walks.

By collecting these various forms of data, and analyzing the results using any of the herein described methods, the customer’s behavioral interactions may be tracked and modeled as they play various games and use the gaming assets of the casino environment. These types of data collection techniques may be used in combination with other customer detection techniques such as the monitoring of customer loyalty card use, credit card and debit card use, ATM usage, and the customer’s purchase of products not directly linked to gaming devices. For example, the purchased products monitored may include food and beverages, gifts, hotel rooms, shows, tours, travel tickets, or any other product offered by a casino.

By monitoring and collating behavioral interaction data in the form of BPDs suitable statistical models are created to enable the calculation to move away from a simple mathematical equation to a more behavioral interactional determination model that can predict how a gaming asset will perform based on various different user’s behavioral interactions with that asset, over and above the normal direct financial interactions previously used.

For example, it is not uncommon for casinos to provide “free” bonus money to customers so that those customers can enter the casino environment and freely gamble that money. The customers may simply enter the casino, gamble the allotted free bonus money, and then walk away with any winnings they have accumulated. Alternatively, a customer may decide to “re-invest” any portion of those winnings back into the casino in order to try and gain further winnings or recoup any losses made. Also, the customer may decide to use money not supplied via the bonus, for example from their own resources, to supplement their winnings or recoup their losses.

None of the above scenarios are currently taken into account when calculating the actual win as they are not directly related to the monetary based mathematical model of $$\text{money in} - \text{money out} = \text{money generated}$$

The same applies to the calculation of theoretical win which also use a monetary based mathematical model with probability values.

A further level of determining the behavioral interactions of customers, and using values from those determined interactions to alter or predict a monetary based value, such as actual win or theoretical win, is required.

The following embodiment describes how the actual win value may be adjusted based on measured behavioral interactions. However, it will be understood that the theoretical win value may also be adjusted, or indeed any other related monetary based value.

The actual win value of a gaming asset may be adjusted to produce the expected win value as customers utilize one or more of the gaming accounting forms mentioned above. Recording devices are arranged to monitor and record whether a gaming asset is being used by a customer with free-plays or bonuses, and also how many jackpots and the level of jackpots that are paid out for that asset. Behavioral interaction data associated with the customer or gaming asset is retrieved and forwarded to the analytical system as herein described.

The behavioral interaction data may or may not be linked to a specific customer or group of customers, or may merely be linked to a specific gaming asset or group of assets. For example, the behavioral interaction data may be allocated to a single customer, a group of defined customers, a single gaming asset (i.e. all customers that play that gaming asset), or group of gaming assets (i.e. behavioral interaction data associated with all customers who use the group of gaming asset).

The behavioral interaction data may also be associated with a specific area or location, such as an area on a gaming floor, a specific casino, groups of casinos or a specific locality.

Further, the behavioral interaction data may be associated with time periods or events. The period or event may be a general time period or event associated with all customers, such as national holiday periods etc, or a specific time period or event associated with individual customers, such as birthdays, weddings etc. For example, a customer’s behavioral interactions may vary depending on when the customer is playing the game. For example, different behavioral interactions may occur depending on whether the customer is playing the game during a holiday period, a business trip, while on their birthday, while at their wedding celebrations etc, and even down to the time of day they are playing.

In summary, the behavioral interaction data is a measure of the way in which gaming assets are used by customers, for example how a specific game is played. Behavioral interaction data is not merely a straight forward collection of data relating to the money being paid in and the money being taken out of an associated asset or by an associated customer. Taking Blackjack as an example, the behavioral interaction data may indicate the likelihood of whether the average customer will split a pair of tens when coming up against specific dealer hands. This type of interaction data may affect the profitability of a game while not changing the theoretical win value. For example, the number of times a customer effectively has an additional hand by splitting will change the profitability depending on whether that extra hand wins or loses, but this interaction will not affect the theoretical win value.

The behavioral interaction data obtained may be used to create visual representations as herein described. The visual representations can be used to see how certain gaming assets or groups of gaming assets are performing taking into account all relevant factors, including behavioral interaction factors, and not merely just the basic transactional data previously used. The visualizations may be interactively adjusted by altering any of the data inputs using any of the herein described associated methods to predict how the variation of one or more types of data will affect the expected win value.

After detecting how the expected win value varies for different gaming assets based on different predicted behavioral interactions, this data enables the profile of a gaming asset to be adjusted based on, for example, the hold percentage of that gaming asset. The profile of the game may be adjusted based on the detected expected win values, either manually or automatically, so that the number of free plays or bonuses, for example, made available to customers is increased or decreased depending on the hold percentage. It will be understood that the hold percentage in this context effectively means the amount of money being made from the asset within a specified time period.

A partial least squares model can be used to provide a redundancy analysis that aids in the prediction of the latent factors that account for the majority of variation in how a game asset performs. That is, the more pertinent factors are detected using the model and these factors are used to more accurately predict the outcome of a gaming asset based on various inputs, while the less pertinent factors are either ignored or given a lower weighting factor. In this way, the performance of a game may be modeled based on determining which behavioral attributes of a customer affect the performance of a game, detecting those behaviors and using those detected behaviors to accurately predict how a game will perform. This is particularly advantageous in determining whether and in what circumstances a newly developed game will become successful and ultimately profitable. This methodology can also be used to predict how existing games will perform under different circumstances. A major advantage to using the partial least squares model is that the solution not only provides an accurate prediction, but also provides information on how the prediction was calculated. The information on how the prediction was calculated may then be used to alter gaming factors associated with the game and so improve the game.

The level of performance of a gaming asset, taking into account the various inputs applied to the partial least squares model, may be monitored and interactively varied using the graphical representations herein described. Therefore, the system can predict how a gaming asset will perform under different circumstances by interactively varying the inputs using any of the techniques described herein.

Figure 8:
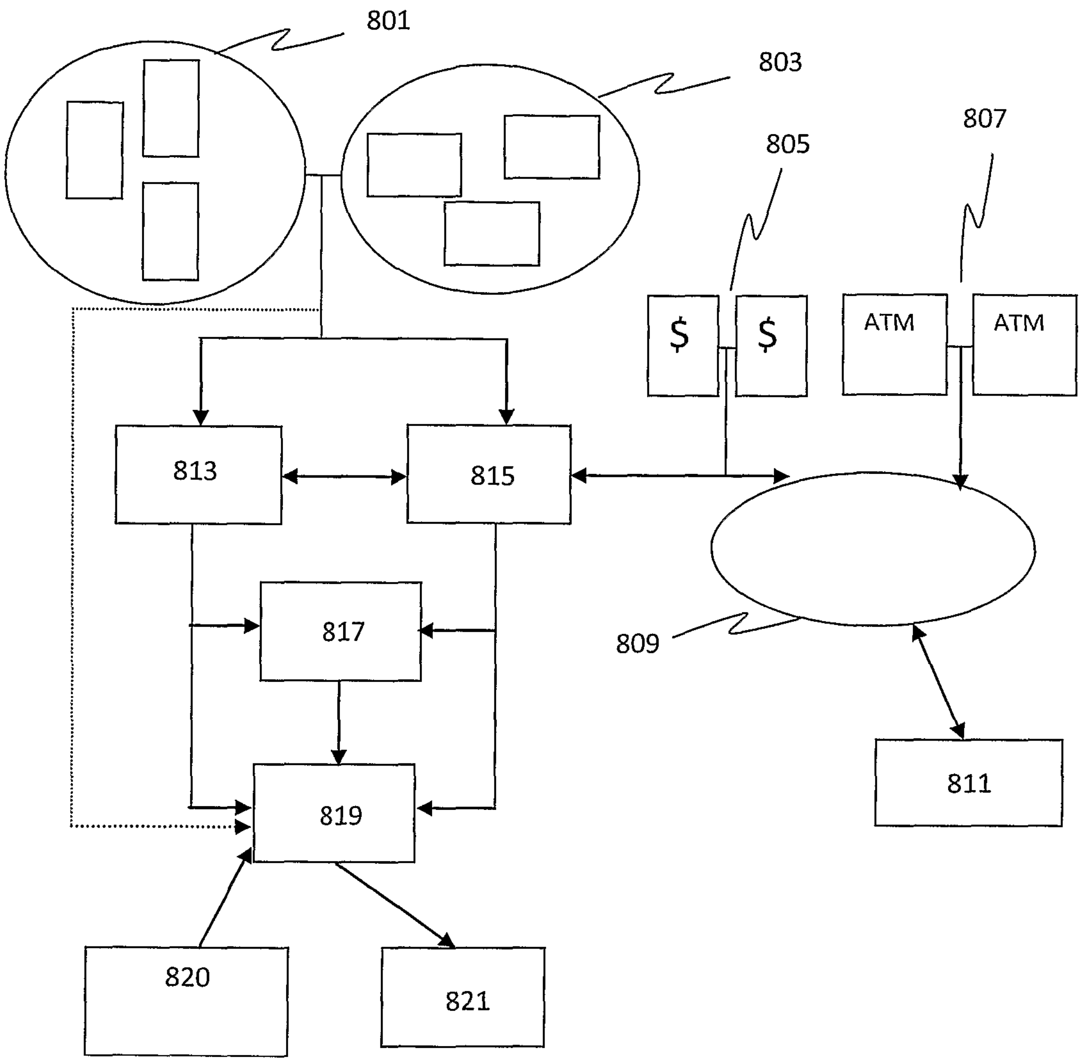
FIG. 8 shows a gaming environment system block diagram according to an embodiment of the present invention.

FIG. 8 shows an example of how the herein described system may be incorporated within a gaming environment. The gaming environment consists of a number of gaming assets that are adapted to communicate electronically with other systems using any suitable protocols, such as hard wired communication protocols and IP data packet protocols. The gaming assets include gaming machines 801 and electronic tables 803 among other electronic gaming devices.

The gaming environment further includes a number of electronic cashier devices 805 and ATMs 807 which are in communication via a Wide Area Network (WAN) 809 with one or more financial databases 811.

It will be understood that the WAN may be replaced by any suitable communications network, such as a local area network or the Internet, for example.

Data from the gaming devices or assets, such as the gaming machines 801 and electronic tables 803, are transferred to a reward program database 813 and customer database 815. It will be understood that these two databases may be combined into a single database. Further, it will be understood that the data from the gaming machines 801 and electronic tables 803 may be either directly transferred to the herein described system 819 or via other systems.

Data from the cashier devices is also transferred to the reward program database 813 and customer database 815. The databases 813 and 815 are in communication with a central hotel management system 817 that oversees the operation of the gaming environment, including the recording of activities of customers in other areas of a casino, such as shops, hotels, spas etc.

According to this embodiment, the system 819 described herein is in communication with the reward program database 813, customer database 815 and central hotel management system 817 so the system can retrieve all required data associated with customer and gaming activities within the gaming environment. It will be understood that the system may retrieve the required data directly or indirectly from each of these sources using any suitable communication techniques. The various methods as described herein are employed by the system 819 to provide an output 821.

Inputs to the system 819 from the reward program database 813 and the customer database 815 may provide at least part of the behavioural interaction data. That is, information concerning how and when a customer earns loyalty points in the reward program provides valuable information associated with the behavioural interactions of the customer. Further, data from the cashiers 805 and ATMs 807 may also become a source of valuable information associated with the behavioural interactions of the customer.

Further behavioural interaction data 820 may be input into the herein described system 819, as explained in more detail below.

Figure 9:
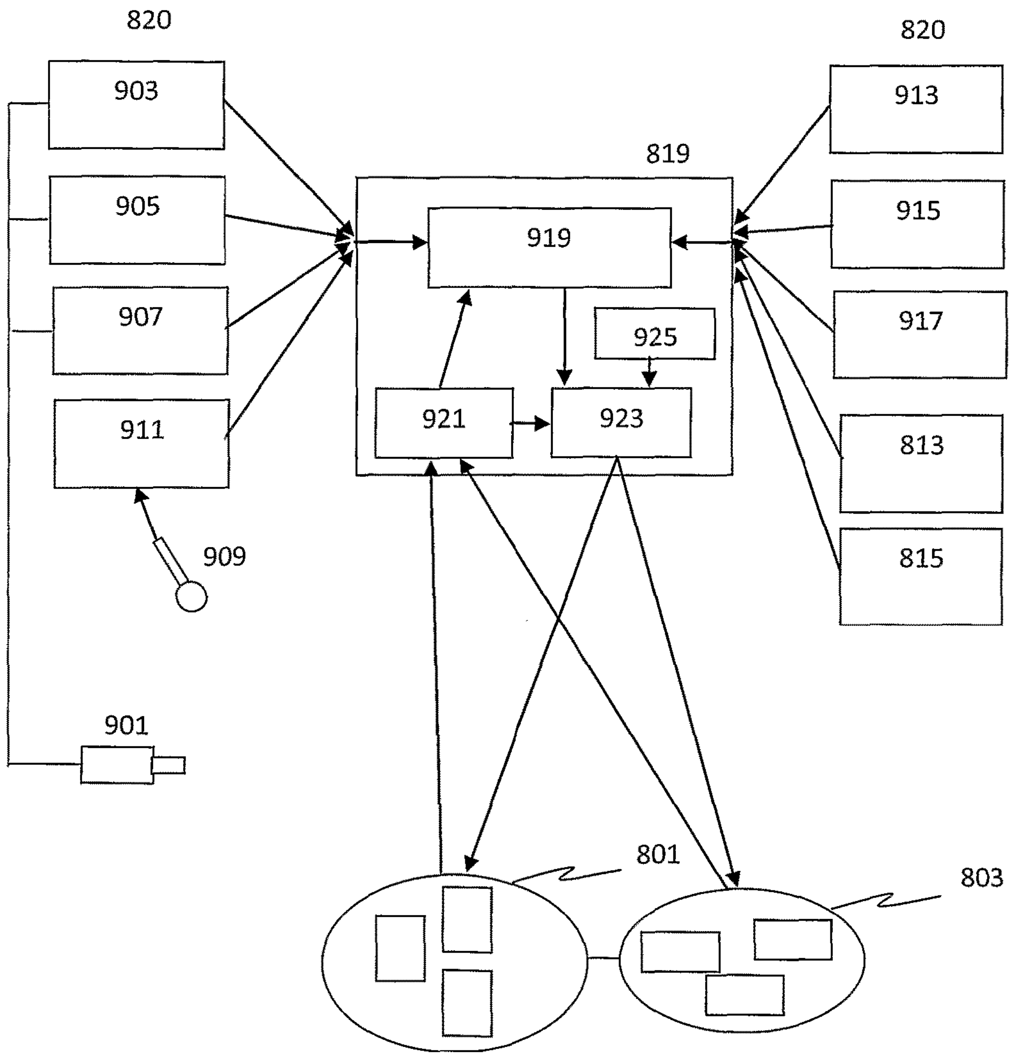
FIG. 9 shows a more detailed system diagram according to an embodiment of the present invention.

FIG. 9 shows a more detailed system diagram indicating how the behavioural interaction data 820 is input into the herein described system 819, and further details of the system 819 itself.

Various systems are incorporated to capture behavioural interaction data via the use of intelligent data collectors as follows.

Cameras 901 are used to monitor the gaming environment. They capture various behavioural interactions of the customers as they interact with the gaming environment by recording video data and forwarding that data to various modules as described below.

A face analysis module 903 is used to analyse the faces of individual customers.

For example, images of the customers' faces may be analysed by face recognition algorithms stored within the face analysis module in order to identify the customers. The identification may be carried out by way of analysing the features of the detected face and comparing those features with stored data, such as that available from the customer database 815 for example. The stored data may be first created during any transactions between the customer and the gaming environment. For example, when the customer joins the reward program an identification card may be required with photo identification, and this photo identification may be stored for facial recognition purposes.

As a further example, the stored customer facial data may be accumulated or created when a customer uses various services in the gaining environment. For example, if a customer accesses or uses part of their customer reward program, the cameras may capture and use the face detected during the transaction and allocate those features to the registered customer. Alternatively, customers may be asked to provide a face scan when registering for the customer reward program. It will be understood that various other methods may be used to accumulate and create stored data associated with a customer's facial features.

According to a further example, customer's faces may be analysed to determine emotions being expressed by the customer. By using image recognition techniques and algorithms, the face analysis module is able to recognise when a monitored face is showing signs of various different emotions by seeing how portions of the face change over time.

For example, excitement may be measured using an algorithm that monitors how open the customer's eyes have become over a short period of time or when compared to a benchmark image.

As a further example, image recognition algorithms may be used to detect whether the customer is smiling or not by detecting the movement of the customer's mouth.

In yet a further example, frustration may be monitored by detecting, for example, that the user is constantly closing their eyes and raising their hands to hold their head.

These various emotions, as well as various other emotions, may be recorded against the individual being monitored while playing on specific gaming devices. The individual being monitored by the cameras may be a customer known to the monitoring system (i.e. a customer that has been recognised and verified by any suitable means) or maybe an as yet unknown customer. If the customer is not yet known to the system, the behavioural interaction data accumulated can still be used by the system for specific gaming devices as the system is able to detect which gaming devices the customer is currently using based on the location and direction the camera is directed and a known floor plan of the environment.

Data from the cameras 901 may also be fed to a location movement monitoring module 905 that includes various algorithms to detect where the customer is actually located within the gaming environment as well as to track their movements as they move around the environment. This may be done by, for example, the system recognising the individual through the face recognition technology described above and through feedback of the camera's location and position. This information not only gives an indication of the customer's current location, but based on previous movement monitoring can provide an indication of where the customer is likely to move to next. For example, by determining a customer's preference for particular gaming assets and particular betting limits, the system is able to predict the customer's movements by using knowledge of the location of matching gaming assets and associated betting limits.

Data from the cameras 901 may also be fed to a gait measurement module 907. The gait measurement module uses image recognition techniques and algorithms to detect how a monitored individual is moving around the environment. This enables the module to determine various behavioural characteristics of the individual. For example, if the system detects that a customer is walking upright at a brisk pace, the system may determine that the individual has a confident mood about them. Whereas, if the individual is slouching and moving slowly around the environment the system may indicate that the customer is not so confident. The gait measurement module may therefore output a confidence value based on the gait of the customer. Alternatively the gait measurement module may output a value that indicates the gait detected.

Therefore, each of the face analysis module 903, location movement monitoring module 905 and gait measurement module 907 receives video data from the video cameras 901 and produces an output which is communicated to the system 819 as herein described. That is, the outputs of the various modules are in the form of a detected or suggested behavioural interaction based on the behavioural interaction input data received.

Microphones 909 may also be used to monitor the gaming environment. The microphones may be used to detect various behavioural interactions based on the utterances or sounds picked up from customers that are being monitored. For example, the microphone may detect gasps of excitement or groans of despair, as well as specific words associated with how they are interacting with the gaming asset.

The microphones are arranged to pick up audio signals that are fed into an audio analysis module 911. The analysis module uses standard voice and sound recognition techniques to detect various different types of utterances, sounds or words. By cross referencing the detected audio with known sounds associated with a predetermined list of suggested emotions, the audio analysis module outputs a detected or suggested behavioural interaction to the herein described system 819.

Further behavioural interaction data 820 may be fed into the system from the reward program database 813 and customer database 815. Also, behavioural interaction data 820 may be provided from a mobile (cell) telephone tracking module 913, RFID tracking module 915 and Bluetooth tracking module 917 as described in more detail below.

The telephone tracking module 913 detects signals received from mobile communication devices, such as cell telephones, associated with individuals to detect where the individual is located. For example, these signals may be received directly from the telephone devices using GPS, Bluetooth or Infra red technologies. Alternatively, the signals may be received via a telecommunications service provider that provides the telecommunications service to the telephone. For example, triangulation techniques may be used by the service provider to determine the location of the telephone device, and these location details may be retrieved by the telephone tracking module.

The RFID tracking module 915 and Bluetooth tracking module 917 track various pieces of gaming equipment in the gaming environment that may be moved around the environment. For example, the gaming assets may have RFID tags or Bluetooth emitting devices installed therein to provide location details. Further, the tracking modules 915 and 917 may also detect RFID tags or Bluetooth devices fitted to other devices which the customer carries around with them. For example, the customer's loyalty reward program card or the customer's Bluetooth enabled key card or telephone. Therefore, using these tracking modules the customer's location and position may be tracked in relation to the various gaming devices.

Figure 10:
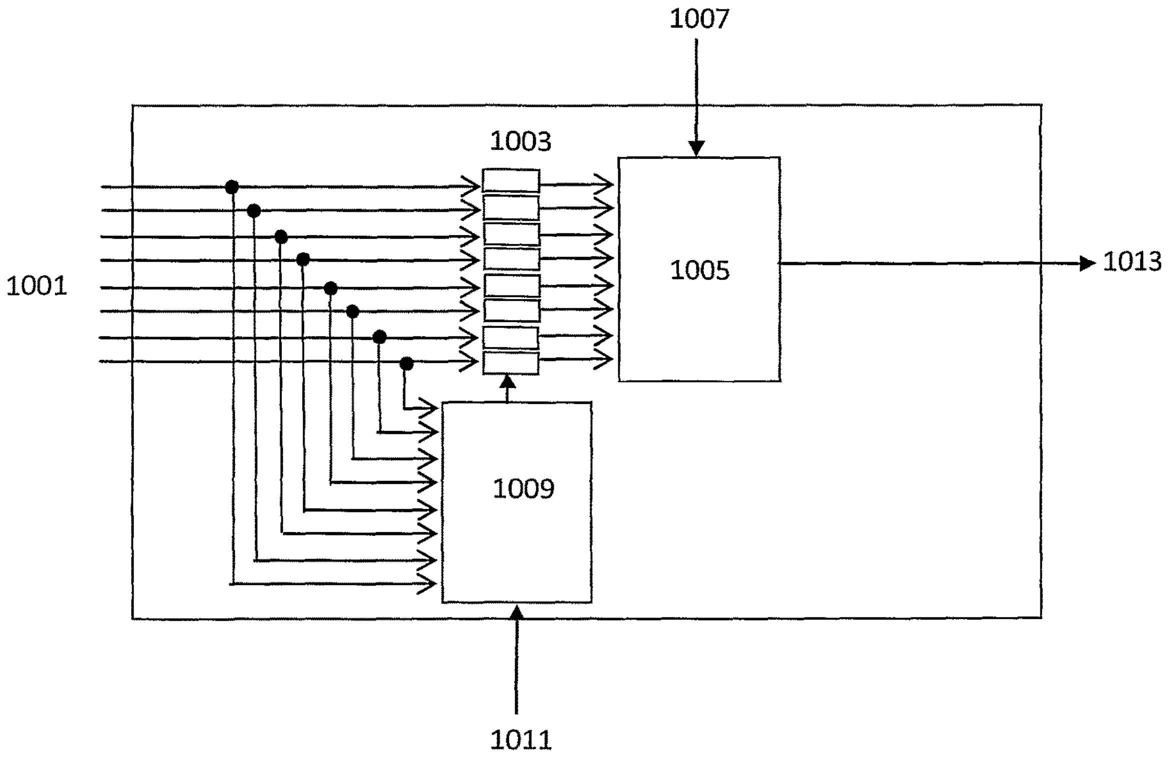
FIG. 10 shows a further system diagram according to an embodiment of the present invention.

Each of the behavioural interaction data signals 1001 (as shown in FIG. 10) are captured by an adjustment module 919 that forms part of the herein described system 819. The "expected win" value is calculated by the adjustment module 919 from an adjusted actual win value retrieved from the gaming machines and electronic tables as follows.

The adjustment module 919 receives the calculated current actual win value 1007 as retrieved by the current actual win receiving module 921. The current actual win receiving module 921 retrieves the current actual win value from the gaming machines 801 and electronic tables 803. Alternatively, the current actual win receiving module 921 may receive data associated with transactions from the gaming assets and calculate the current actual win value from that data.

The adjustment module 919 adjusts the current actual win value using the behavioural interaction data as described in more detail below. The adjusted actual win value, i.e. the "expected win" value is input into a profile adjuster module 923. The profile adjuster module 923 is arranged to adjust how various games 801 and electronic tables 803 operate based on a set of stored rules 925 that are applied to the profile adjuster module 923. For example, the profile adjuster module may communicate instructions to a gaming asset that cause the gaming asset to modify how it operates.

The adjustment module 919 of the system will now be described with reference to a earning or teaching phase, and a real time processing phase.

During the learning/teaching phase, data is applied to the adjustment module 919 in order for the module to learn the relevance of the inputs with respect to a desired output. The relevance of these inputs to achieve a desired output is then used to set a series of weighted factors so that when real time data inputs are applied, they can be adjusted or modified automatically based on a desired output.

During the real time processing phase, the interactional data inputs are modified by the weighted factors prior to being submitted to a calculation module. The calculation module then adapts the measured actual win value to produce a calculated expected win value.

Referring to FIG. 10 a more detailed system block diagram of the adjustment module 919 is provided.

The various forms of behavioural interaction data 1001 are input into the adjustment module 919. The behavioural interaction data may be a mix of any of the various types of interaction data detected by the intelligent data collectors discussed above as well as data retrieved from the customer and loyalty program databases.

The behavioural interaction data is fed through a plurality of weighting modules 1003 to the calculation module 1005. The weighting values applied to the weighting modules may initially be set at a factor of 1, i.e. resulting in no weighting being applied to any of the behavioural interaction data inputs.

The behavioural interaction data is simultaneously fed into an interaction analysis module, which in this embodiment is a regression module 1009. Preferably, the regression module is a partial least squares module and is arranged to apply a partial least squares algorithm to the data input into the regression module 1009. Also input into the regression module is the actual win value as automatically calculated by the gaming machines and electronic tables based on factual monetary data.

The regression module determines which of the behavioural interaction inputs are the most relevant in relation to a desired (or pre-determined) expected win value, or actual win adjustment value (i.e. the amount the actual win value is to be adjusted).

The regression module determines which of the behavioural interaction inputs are the most relevant by applying a repeated regression model and measuring the output of the regression model. Alternatively, the regression module may be replaced by alternative interaction analysis modules such as a principal components module or factor analysis module, which may utilize principal components analysis algorithms or factor analysis algorithms respectively, to determine which of the behavioural interaction inputs are the most relevant.

During the training phase of the system, the output of the regression module 1009 adapts the weighting values applied by each of the weighting modules 1003 to ensure the most relevant of the behavioural interactions have more weight applied, and the least relevant have less or no weight applied.

That is, the regression module determines the most relevant inputs for a desired expected win value and applies more weight to those inputs than the lesser relevant inputs.

During the real time processing phase, a calculation module 1005 takes the weighted values of the behavioural interaction data received from the weighting modules 1003 and calculates how much the actual win value 1007 is to be adjusted to produce the calculated expected win value 1013. The adjustment of the actual win value may take many different forms. For example, the adjustment may be determined by way of calculating a percentage increase or decrease of the actual win value based on the weighted inputs of the behavioural interaction data. Alternatively, the adjustment may be determined by way of adding, subtracting, multiplying or dividing the actual win value by a calculated factor that is based on the weighted inputs of the behavioural interaction data.

Optionally, the weighted values of the weighting modules 1003 may be dynamically adjusted by the regression module 1009 based on the behavioural interaction data and the adjusted actual win values being calculated in real time. This ensures that the expected win value is continually modified using the most up to date and relevant behavioural interaction data.

Referring to FIG. 9, details of how the profiles of the gaming machines and electronic tables may be adjusted is now provided.

The adjustment module 919 outputs the calculated expected win value to a profile adjuster module 923. The profile adjuster module 923 also receives input from a rules engine 925 that defines how a profile of a gaming machine or electronic table is to be adjusted based on the currently measured expected win value. Thus, upon receiving the calculated expected win value for a specific gaming device, the profile adjuster module refers to the rules to determine how that gaming device is to be adjusted, and then sends out an adjustment signal to the relevant gaming device (801, 803).

For this embodiment, where the actual win value is adjusted to create an expected win value based on the behavioural interactions of a customer, it can be seen that the adjusted actual win value effectively provides an actual win value with the skill factor associated with the customer subtracted. However, the expected win value includes the effects of luck.

In an embodiment where the theoretical win value is adjusted to create an expected win value based on the behavioural interactions of a customer, it can be seen that the adjusted theoretical win value effectively provides a theoretical win value adjusted for the skill factor associated with customer. However, in this case, the expected win value does not include the effects of luck.

Aesthetics

A system and method is now described showing how various relevant aesthetic qualities may be determined for specific gaming devices in relation to specific behavioural interactions associated with the gaming devices.

A gaming device may be technically well put together or built to be mentally stimulating, however these factors are not a measure of the aesthetic appeal of the gaming device to the customers playing the game. Modeling this aesthetic appeal may assist in maximizing a games profitability in a gaming environment.

A common current practice is to develop games and then, after development, determine how aesthetically pleasing those games are through customer testing. However, the development process can be particularly costly and timely without any real perception of whether the finished game product will be profitable.

In order to address this problem, a system and method is provided that analyses data to determine what features of a game appeal to a user. That is, the system determines how the aesthetic qualities that appeal to a human are linked to a particular game.

The features that may work with one game may not necessarily work with another game. For example, although it may be determined that certain flashing graphics appeal to a customer on one particular slot machine, those same flashing graphics may detract from the customer's enjoyment if applied to another slot machine or to a different game.

By building an aesthetic profile using the herein described system future actions can be influenced. For example, the profile may be used to influence how certain games or types of games are developed or modified to fully maximize those games potential in a gaming environment.

In order to build the aesthetic profile, the gambling behavior of certain customers is monitored for specific games or groups of games with one or more aesthetic appeal features. For example, the aesthetic appeal of the game may be due to any one or a combination of the following aesthetic features: the color(s) used; the layout or configuration of the game's features; the number of game features; the quality of the displayed features; the level of brightness or clarity of the game's display and features; the type, form or quality of the sounds used; the use of flashing images; the use of animations the use of different controls including: touch sensitive controls, track ball controls, mouse controls, voice activated controls, eye movement detection controls; the size of the display; interactivity controls; personal involvement.

Once the link or links between the gambling behavior of a customer and the aesthetic appeal features of certain games is determined using the herein described system and methods, those links may be used to develop a profile. That profile may then be used to determine improvements to existing games, or to develop new games, which take into account the link between the human aesthetic appeal of a game and how that game is played. This will ultimately result in the ability to adjust the profitability of that game by changing the aesthetic appeal of the game. The profile may be developed over time by continually collecting vast amounts of data from different games with different aesthetic features, which are then related to different gambling behaviors and profitability measurements. This data can be used to determine how profitable, successful or popular certain games are. Of course it will be understood that although a game is popular due to its aesthetic appeal it may not be particularly profitable due to other factors, such as the maximum bet allowed, or the location of the game, for example.

As in all modeling situations, in order to collect the correct data, it is required that the correct questions are asked. That is, how do customers react when provided with certain aesthetic features in different scenarios? This, combined with accurate detection of the reactions and recordal of that data into the profile, provides a very powerful tool for future game development and improvement.

Figure 11:
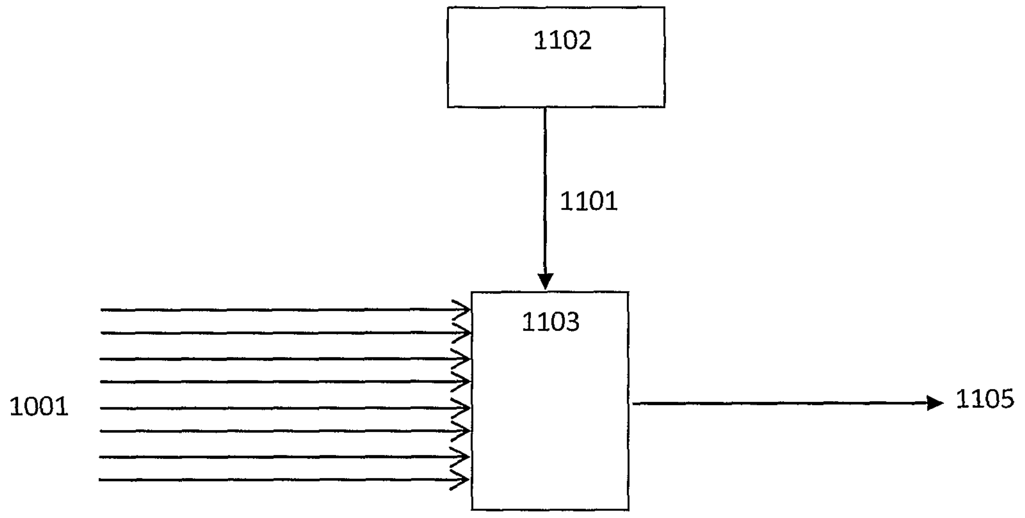
FIG. 11 shows a further system diagram according to an embodiment of the present invention.

Referring to FIG. 11, a detailed system block diagram is provided to show how the herein described system can be modified to use measured BPDs to correlate aesthetic features with behavioral interaction data.

As discussed above in relation to FIG. 9, various behavioral interaction data 1001 may be retrieved using intelligent data collectors and various databases.

Further, data 1101 associated with relevant aesthetic features for certain games may be retrieved from a data store 1102. The different types of aesthetic features are discussed above.

By applying the retrieved aesthetic features 1101 and gambling behaviors 1001 associated with a game and applying them as an input to a partial least squares module 1103 which forms part of the herein described system, a determination output 1105 on how the aesthetic features correlate with certain behavioral interactions is produced. Therefore, the correct aesthetic features can be chosen and applied to certain gaming devices to produce a desired behavioral interaction from the user.

Therefore, the correlation output 1105 may provide a prediction of the games features that are likely to be appealing to a customer, and so are suitable for development while minimizing the risk of wasting valuable development money and time.

Alternatively, the aesthetic features and gambling behaviors associated with a game may be analyzed using other forms of regression analysis to determine how they correlate.

Therefore, the data visualization techniques described herein transform the raw data received into useful data related to behavioural interactions to enable more accurate predictions associated with gaming data, as well as enabling the adjusted data to be visually represented in a manner that conveys the information to a user in an efficient manner.

It will be understood that any reference to displaying a visual representation on a screen equally applies to storing that representation or printing the representation onto any suitable medium. As explained above, the data used to display, store or print may be adjusted by the system according to the purpose of the data.

Further, it will be understood that any references in this document to any modules, engines or associated processing, analysis, determination, or other steps, may be implemented in any form. For example, the modules or engines may be implemented, and the associated steps may be carried out, using hardware, firmware or software.

GLOSSARY

| Term | Definition |
| --- | --- |
| Agile Development | Agile software development is a conceptual framework for software engineering that promotes development iterations throughout the life-cycle of the project. |

-continued

| Term | Definition |
|---|---|
| | There are many agile development methods; most minimize risk by developing software in short amounts of time. Software developed during one unit of time is referred to as an iteration, which may last from one to four weeks. Each iteration is an entire software project: including planning, requirements analysis, design, coding, testing, and documentation. An iteration may not add enough functionality to warrant releasing the product to market but the goal is to have an available release (without bugs) at the end of each iteration. At the end of each iteration, the team re-evaluates project priorities. Wikipedia[ix] |
| BPD Packages | A BPD Package is made up from a set of related BPDs. This relationship (between a BPD Package and its BPDs) is defined using metadata.<br>BPD Packages can be thought of as the Visual Document's vocabulary. |
| Catalog | The described catalog is used to store permanent and temporary objects that are necessary for creation and storage of Visual Documents. These may include Visual Designs, BPDs, Configuration tools and other objects.<br>There may be multiple catalogs of different types (such as - database, flat file) which are configured by an integrator - dependent on customer requirements.<br>All items in a catalog are identified by a unique ID and can only be accessed by those with the correct authorization. |
| Data Packages | Data Packages contain data that can be sold with subscription or service provision including an associated managed dataset. For example, census data will be available as a Data Package; this Data Package will enable the described solution users to interact and use a slowly changing dataset called census. (Census data can be updated after each census and is often modeled between each census). |
| Dimension | Dimensional modeling always uses the concepts of facts (sometimes referred to as measures) and dimensions. Facts are typically (but not always) numeric values that can be aggregated, and dimensions are groups of hierarchies and descriptors that define the facts. For example, sales amount is a fact; timestamp, product, register#, store#, etc. are elements of dimensions. Wikipedia[x] |
| Dimensional Modeling | DM is a logical design technique that seeks to present the data in a standard, intuitive framework that allows for high-performance access. It is inherently dimensional, and it adheres to a discipline that uses the relational model with some important restrictions. Every dimensional model is composed of one table with a multipart key, called the fact (sometimes referred to as measures) table, and a set of smaller tables called dimension tables. Each dimension table has a single-part primary key that corresponds exactly to one of the components of the multipart key in the fact table. Intelligent Enterprise[xi] |
| Enterprise Java Beans (EJBs) | In a typical J2EE application, Enterprise JavaBeans (EJBs) contain the application's business logic and live business data. Although it is possible to use standard Java objects to contain your business logic and business data, using EJBs addresses many of the issues you would find by using simple Java objects, such as scalability, lifecycle management, and state management. Wikipedia[xii] |
| Fact | Dimensional modeling always uses the concepts of facts (sometimes referred to as measures) and dimensions. Facts are typically (but not always) numeric values that can be aggregated, and dimensions are groups of hierarchies and descriptors that define the facts. For example, sales amount is a fact; timestamp, product, register#, store#, etc. are elements of dimensions. Wikipedia[xiii] |
| IIOP (Internet Inter-ORB Protocol) | IIOP (Internet Inter-ORB Protocol) is a protocol that makes it possible for distributed programs written in different programming languages to communicate over the Internet. SearchCIO-Midmarket[xiv] |
| KML | Keyhole Markup Language.<br>Google ™ Earth is a geographic browser - a powerful tool for viewing, creating and sharing interactive files containing highly visual location-specific information. These files are called KMLs (for Keyhole Markup Language): what HTML is to regular Internet browsers, KML is to geographic browsers. You can open KML files in both Google ™ Earth and Google ™ Maps, as well as in many other geographic browsers. Google ™ Maps[xv] |
| MDT | The average time that a system is non-operational. This includes all time associated with repair, corrective and preventive maintenance; self imposed downtime, and any logistics or administrative delays. The difference between MDT and MTTR (mean time to repair) is that MDT includes any and all delays involved; MTTR looks solely at repair time. Wikipedia[xvi] |
| Metadata | Metadata describes how data is queried, filtered, analyzed, and displayed in the described solution. In general terms, metadata is data about data. For example, in a library the metadata (pertaining to the catalog of books) could be - the title of the book, the author(s), categories (e.g. reference, fiction, non-fiction etc), physical location. This metadata can be used in searches, directories etc to help users locate books. |
| MTBF | Mean time between failures (MTBF) is the mean (average) time between failures of a system, and is often attributed to the 'useful life' of the device i.e. not including 'infant mortality' or 'end of life'. Calculations of MTBF assume that a system is 'renewed', i.e. fixed, after each failure, and then returned to service immediately after failure. The average time between failing and being returned to service is termed mean down time (MDT) or mean time to repair (MTTR).<br>MTBF = (downtime − uptime)/number of failures. Wikipedia[xvii] |
| MTTR | Mean Time to Recovery - the average time that a device will take to recover from a non-terminal failure. Examples of such devices range from self-resetting fuses (where the MTTR would be very short, probably seconds), up to whole systems which have to be replaced. The MTTR would usually be part of a maintenance contract, where the user would pay more for a system whose MTTR was 24 hours, than for one of, say, 7 days. This does not mean the supplier is guaranteeing to have the system up and running again within 24 hours (or 7 days) of being notified of the failure. It does mean the average repair time will tend towards 24 hours (or 7 days). A more useful maintenance contract measure is the maximum time to recovery which can be easily measured and the supplier held accountable. Wikipedia[xviii] |
| OLAP | On Line Analytical Processing.<br>OLAP performs multidimensional analysis of business data and provides the capability for complex calculations, trend analysis, and sophisticated data modeling.<br>OLAP enables end-users to perform ad hoc analysis of data in multiple dimensions, thereby providing the insight and understanding the need for better decision making. Paris ™ Technologies[xix] |
| Planogram | A planogram is a diagram of fixtures and products that illustrates how and where retail products should be displayed, usually on a store shelf in order to increase customer purchases. They may also be referred to as planograms, plan-o-grams, schematics (archaic) or POGs. A planogram is often received before a product reaches a store, and is useful when a retailer wants multiple store displays to have the same look and feel. Often a consumer packaged goods manufacturer will release a new suggested planogram with their new product, to show how it relates to existing products in said category. Planograms are used nowadays in all kind of retail areas. A planogram defines which product is placed in which area of a shelving unit and with which quantity. The rules and theories for the creation of a planogram are set under the term of merchandising. Wikipedia[xx] |
| Request Queue | The Request Queue manages Visual Documents requests generated by a user or the scheduler.<br>As requests are processed, the Visual Document maintains various statuses until the Visual Document is complete and available to be viewed by a user. |

-continued

| Term | Definition |
|---|---|
| SaaS | Software as a Service. A software application delivery model where a software vendor develops a web-native software application and hosts and operates (either independently or through a third-party) the application for use by its customers over the Internet. Customers do not pay for owning the software itself but rather for using it. Wikipedia[xxi] |
| Scrum | Scrum is an agile process that can be used to manage and control software development. With Scrum, projects progress via a series of iterations called sprints. These iterations could be as short as 1 week or as long as 1 month. Scrum is ideally suited for projects with rapidly changing or highly emergent requirements. The work to be done on a Scrum project is listed in the Product Backlog, which is a list of all desired changes to the product. At the start of each sprint a Sprint Planning Meeting is held during which the Product Owner prioritizes the Product Backlog and the Scrum Team selects the tasks they can complete during the coming Sprint. These tasks are then moved from the Product Backlog to the Sprint Backlog. Each day during the sprint a brief daily meeting is held called the Daily Scrum, which helps the team stay on track. At the end of each sprint the team demonstrates the completed functionality at a Sprint Review Meeting. |
| Self Organizing Maps (SOM) | A type of artificial neural network that is trained using unsupervised learning to produce a low-dimensional (typically two dimensional), representation of the input space of the training samples, called a map. The map seeks to preserve the topological properties of the input space. Wikipedia[xxii] |
| Servlets | Servlets are modules of Java code that run in a server application (hence the name "Servlets", similar to "Applets" on the client side) to answer client requests. Servlets are not tied to a specific client-server protocol but they are most commonly used with HTTP and the word "Servlet" is often used in the meaning of "HTTP Servlet". Servlets make use of the Java standard extension classes. Since Servlets are written in the highly portable Java language and follow a standard framework, they provide a means to create sophisticated server extensions in a server and operating system independent way. Typical uses for HTTP Servlets include: 1. Processing and/or storing data submitted by an HTML form. 2. Providing dynamic content, e.g. returning the results of a database query to the client. 3. Managing state information on top of the stateless HTTP, e.g. for an online shopping cart system which manages shopping carts for many concurrent customers and maps every request to the right customer. Servlet Essentials[xxiii] |
| Subject Matter Expert (SME) | The Subject Matter Expert is that individual who exhibits the highest level of expertise in performing a specialized job, task, or skill within the organization. Six Sigma[xxiv] |
| WebSphere | WebSphere is an IBM ™ brand of products that implement and extend Sun's JavaTwoEnterpriseEdition (J2EE) platform. The Java-based application and transaction infrastructure delivers high-volume transaction processing for e-business and provides enhanced capabilities for transaction management, as well as security, performance, availability, connectivity, and scalability. IBM ™ WebSphere Product Pages[xxv] |

What we claim is:

1. In a data analysis computer system, a method of determining a gaming device adjustment value for a gaming device located in a gaming environment, the gaming device in communication with the data analysis computer system, the method including the steps of:

receiving images on the data analysis computer system of the gaming environment from at least one camera;

analyzing the received images by intelligent emotional data collectors on the data analysis computer system to produce gaming device emotional behavioral interaction data associated with the gaming device, the intelligent emotional data collectors comprised of one or more of the group consisting of a location movement monitoring module, a gait measurement module, and a face analysis module;

receiving profitability data associated with the gaming device on the data analysis computer;

receiving, at an adjustment module on the data analysis computer system, the gaming device emotional behavioral interaction data associated with the gaming device from the intelligent emotional data collectors and the current actual win value from the gaming device;

applying, at the adjustment module, determined weighting values to the gaming device emotional behavioral interaction data to develop weighted values of the gaming device emotional behavioral interaction data;

performing, at the adjustment module, interaction analysis on the received gaming device emotional behavioral interaction data in relation to the gaming device current actual win value to determine the relevancy of the gaming device emotional behavioral interaction data;

determining a gaming device adjustment value based on the interaction analysis and the weighted values of the gaming device emotional behavioral interaction data, the gaming device adjustment value being a monetary based value;

determining a gaming device profitability adjustment value based on the gaming device profitability data, the gaming device profitability adjustment value being a monetary based value; and applying the gaming device adjustment value and the gaming device profitability adjustment value to the gaming device current monetary based value to adjust a profile of the gaming device.

2. The method of claim 1 further including the steps of the adjustment module:

applying the determined weighting values to a plurality of weighting modules, applying the gaming device emotional behavioral interaction data to the weighting modules to produce weighted values of the gaming device emotional behavioral interaction data, and determining the gaming device adjustment value in a calculation module based on the weighted values of the gaming device emotional behavioral interaction data.

3. The method of claim 2 further including the steps of:

applying the received gaming device emotional behavioral interaction data and the gaming device current actual win value to an interaction analysis module to produce an output, and determining the weighting values based on the output of the interaction analysis module.

4. The method of claim 3 further including the step of the interaction analysis module:

adjusting the weighting values to change the effect the gaming device emotional behavioral interaction data has when determining the gaming device adjustment value.

5. The method of claim 4, wherein the weighting values are dynamically applied to adjust the profile of the gaming device while in use.

6. The method of claim 4, wherein the weighting values are applied to adjust the profile of the gaming device prior to use.

7. In a data analysis computer system, a method of determining the correlation between aesthetic qualities of a gaming device located in a gaming environment, the gaming device in communication with the data analysis computer system and emotional behavioral interactions associated with the gaming device, the method including the steps of:

receiving images on the data analysis computer system of the gaming environment from at least one camera;

analyzing the received images by intelligent emotional data collectors on the data analysis computer system to produce gaming device emotional behavioral interaction data associated with the gaming device, the intelligent emotional data collectors comprised of one or more of the group consisting of a location movement monitoring module, a gait measurement module, and a face analysis module;

further analyzing the received images to produce gaming device aesthetic feature appeal data:

receiving, at an adjustment module on the data analysis computer system, a gaming device current actual win value from the gaming device;

applying at the adjustment module, determined weighting values to the gaming device emotional behavioral interaction data to develop weighted values of the gaming device emotional behavioral interaction data;

performing, at the adjustment module, interaction analysis on the received gaming device emotional behavioral interaction data in relation to the gaming device current actual win value;

determining a gaming device adjustment value based on the interaction analysis and the weighted values of the gaming device emotional behavioral interaction data, the gaming device adjustment value being a monetary based value;

determining a gaming device aesthetic feature adjustment based on the gaming device aesthetic feature appeal data; and applying the gaming device adjustment value to the gaming device current actual win value and using the gaming device aesthetic feature adjustment to adjust a profile of the gaming device.

8. The method of claim 7 wherein the interaction analysis is one of regression analysis, partial least squares analysis, principal components analysis and factor analysis.

9. A data analysis computer system Including at least one processor and at least one memory device which stores a plurality of instructions, which when executed by the at least one processor, cause the at least one processor to determine a gaming device adjustment value of a gaming device located in a gaming environment, the gaming device in communication with the data analysis computer system, the system including an adjustment module arranged to:

receive images on the data analysis computer system of the gaming environment from at least one camera;

analyze the received images by intelligent emotional data collectors on the data analysis computer system to produce gaming device emotional behavioral interaction data associated with the gaming device, the intelligent emotional data collectors comprised of one or more of the group consisting of a location movement monitoring module, a gait measurement module, and a face analysis module;

receive profitability data associated with the gaming device on the data analysis computer;

receive a gaming device current actual win value from the gaming device;

apply determined weighting values to the gaming device emotional behavioral interaction data to develop weighted values of the gaming device emotional behavioral interaction data;

perform interaction analysis on the received gaming device emotional behavioral interaction data in relation to the gaming device current actual win value to determine the relevancy of the gaming device emotional behavioral interaction data;

determine the gaming device adjustment value based on the interaction analysis and the weighted values of the gaming device emotional behavioral interaction data, the adjustment value being an actual win value;

determine a gaming device profitability adjustment value based on the profitability data associated with the gaming device, the gaming device profitability adjustment value being a monetary based value; and apply the gaming device adjustment value and the gaming device profitability adjustment value to the gaming device current actual win value to adjust a profile of the gaming device.

10. The system of claim 9 wherein the adjustment module is further arranged to:

apply the determined weighting values to a plurality of weighting modules, apply the gaming device emotional behavioral interaction data to the weighting modules to produce weighted values of the gaming device emotional behavioral interaction data, and determine the gaming device adjustment value in a calculation module based on the weighted values of the gaming device emotional behavioral interaction data.

11. The system of claim 10 wherein the adjustment module includes an interaction analysis module, and the adjustment module is arranged to:

apply the received gaming device emotional behavioral interaction data and the gaming device current actual win value to the interaction analysis module to produce an output, and determine the weighting values based on the output of the interaction analysis module.

12. The system of claim 11 wherein the interaction analysis module is further arranged to adjust the weighting values to change the effect the gaming device emotional behavioral interaction data has when determining the gaming device adjustment value.

13. The system of claim 12, wherein the weighting values are dynamically applied by the interaction analysis module to adjust the profile of the gaming device while in use.

14. The system of claim 12, wherein the weighting values are applied by the interaction analysis module to adjust the profile of the gaming device prior to use.

15. A data analysis computer system Including at least one processor and at least one memory device which stores a plurality of instructions, which when executed by the at least one processor, cause the at least one processor to determine the correlation between aesthetic qualities of a gaming device located in a gaming environment, the gaming device in communication with the data analysis computer system and emotional behavioral interactions associated with the gaming device, the system including an adjustment module arranged to:

receive images on the data analysis computer system of the gaming environment from at least one camera;

analyze the received images by intelligent emotional data collectors on the data analysis computer system to produce gaming device emotional behavioral interaction data associated with the gaming device, the intelligent emotional data collectors comprised of one or more of the group consisting of a location movement monitoring module, a gait measurement module, and a face analysis module;

further analyze the received images to produce gaming device aesthetic feature appeal data:

receive a gaming device current actual win value from the gaming device;

apply determined weighting values to the gaming device emotional behavioral interaction data to develop weighted values of the gaming device emotional behavioral interaction data;

perform interaction analysis on the received gaming device emotional behavioral interaction data in relation to the gaming device current actual win value;

determine a gaming device adjustment value based on the interaction analysis and the weighted values of the gaming device emotional behavioral interaction data, the gaming device adjustment value being a monetary based value for the gaming device;

determine a gaming device aesthetic feature adjustment based on the gaming device aesthetic feature appeal data; and apply the gaming device adjustment value and the gaming device aesthetic feature adjustment to the gaming device actual win value to adjust a profile of the gaming device.

16. The system of claim 15 wherein the interaction analysis is performed by one of a regression analysis module, partial least squares analysis module, principal components analysis module and factor analysis module.

17. The method of claim 1, wherein the interaction analysis is one of regression analysis, partial least squares analysis, principal components analysis and factor analysis.

18. The system of claim 9, wherein the interaction analysis is performed by one of a regression analysis module, partial least squares analysis module, principal components analysis module and factor analysis module.

* * * * *